US011706479B2

(12) United States Patent
Giladi et al.

(10) Patent No.: US 11,706,479 B2
(45) Date of Patent: Jul. 18, 2023

(54) METHODS AND SYSTEMS FOR STORING USER-SPECIFIC MEDIA SEQUENCES

(71) Applicant: Comcast Cable Communications, LLC, Philadelphia, PA (US)

(72) Inventors: Alexander Giladi, Denver, CO (US); Weidong Mao, West Windsor, NJ (US); Robert Ford, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 39 days.

(21) Appl. No.: 16/721,600

(22) Filed: Dec. 19, 2019

(65) Prior Publication Data

US 2021/0195279 A1  Jun. 24, 2021

(51) Int. Cl.
*H04N 21/433* (2011.01)
*H04N 21/432* (2011.01)
*H04N 21/45* (2011.01)
*H04N 21/475* (2011.01)

(52) U.S. Cl.
CPC ..... *H04N 21/4332* (2013.01); *H04N 21/4325* (2013.01); *H04N 21/4524* (2013.01); *H04N 21/4751* (2013.01)

(58) Field of Classification Search
None
See application file for complete search history.

(56) References Cited

U.S. PATENT DOCUMENTS

| 2004/0064416 | A1* | 4/2004 | Peled ............... H04N 21/8456 707/E17.116 |
| 2008/0178225 | A1* | 7/2008 | Jost ..................... H04N 5/765 725/58 |
| 2012/0159558 | A1  | 6/2012 | Whyte et al. |
| 2014/0280688 | A1  | 9/2014 | Mao et al. |
| 2016/0050468 | A1* | 2/2016 | Morten ........... H04N 21/44016 725/28 |
| 2016/0301958 | A1* | 10/2016 | Srinivasan ...... H04N 21/23476 |
| 2017/0034543 | A1* | 2/2017 | Gerede ............ H04N 21/2393 |
| 2017/0199883 | A1  | 7/2017 | Terry et al. |
| 2018/0270534 | A1* | 9/2018 | Badawiyeh ......... H04N 21/812 |

OTHER PUBLICATIONS

Iso Copyright Office: "ISO/IEC 14496-12 Information technology—Coding of audio-visual objects—Part 12: ISO base media file format", Oct. 1, 2005, Retrieved from the Internet: URL:https://1.web.umkc.edu/lizhu/teaching/2016sp.video-communication/ref/mp4.pdf.

(Continued)

*Primary Examiner* — Jefferey F Harold
*Assistant Examiner* — Charles N Hicks
(74) *Attorney, Agent, or Firm* — BakerHostetler

(57) ABSTRACT

Methods and systems are described for storing content. The content may be divided into user-specific portions and common portions. One or more selection rules may be used to divide the content into the user-specific portion and the common portions. The one or more selection rules may be selected such that the common portion is not decodable without the user-specific portions. The user-specific portions or data indicating a location of the user-specific portion may be stored in user-specific storage. The user-specific storage may be used to determine content for playback to a user.

30 Claims, 16 Drawing Sheets

(56) References Cited

OTHER PUBLICATIONS

Venugopala et al.,"An approach for bitstream video watermarking on mobile device", 2016 International Conference on Signal Processing, Power and Embedded System (SCOPES), IEEE, Oct. 3, 2016, pp. 578-583.
US Patent Application filed on Aug. 18, 2020, entitled "Methods and Systems for Accessing Stored Content", U.S. Appl. No. 16/996,608.

* cited by examiner

METHODS AND SYSTEMS FOR STORING USER-SPECIFIC MEDIA SEQUENCES

BACKGROUND

A variety of services are available that provide for personalized consumption of content. Users may desire to store content from a live channel for later consumption. However, content may be provided to different users in different container formats. The data may be required to be stored and accessed according to various security measures. Thus, there is a need for more sophisticated techniques for content storage and access.

SUMMARY

Systems and methods are described herein for storing content for access by different users. A user may request that content, such as content streamed on a content channel, be stored for later access. The content may be stored by separately storing a first portion of the content in user-specific storage and a second portion of the content in a common storage (e.g., or common file). The user-specific storage may be associated with a user account. The common storage may be available to a plurality of user accounts. The first portion stored in the user-specific storage may be different for different users. The content may comprise a sequence of bytes (e.g., or bits) comprising at least a portion of a frame of the content. The sequence of bytes may comprise macroblock data of the content. The first portion may comprise a first number of the sequence of bytes accessible by a specific user account. The remaining portion of the sequence of bytes may be stored in common storage (e.g., or a common file) and be available to multiple user accounts. The second portion stored in the common storage may be unplayable without the corresponding user portions. An index file (e.g., or other data structure) may be stored in the user-specific storage for each user. The index file may indicate a location of the first portion, a location of the second portion, an order of the first portion and the second portion, a combination thereof, and/or the like. The index file may be used to determine (e.g., or reconstitute) the content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Systems and methods are described herein for storing content. An example content system may allow users to record or otherwise store content. The content may comprise a content asset or a portion thereof transmitted via a content channel. The system may allow different users to store the same content for later access. The content may be sent to different users in different formats, such as international standards organization base media file format (ISO-BMFF) based formats, motion picture experts group 2 (MPEG-2) transport stream format, Matroska format, and/or the like.

The content may be stored using authentication and security techniques. Encryption keys may be used to encrypt the content before sending the content to the user. The encryption keys may frequently change. Different encryption keys may be used for different users. If the content is stored unencrypted, the content may be re-encrypted in response to a user request for the content. Re-encryption to a complete media file may have high computational cost. The disclosed system allows for storing content without having to re-encrypt the complete media file.

Watermarking may be used to distinguish content sent to different users. If watermarking is used, the system may be configured to modify the content to include watermarking information. One or more watermarked slices of video may be added and/or replaced in the content (e.g., to be able to better identify a leaker). The disclosed system may be configured to preserve watermarking while storing the content for different users.

The content may be deconstructed (e.g., or subdivided) into different portions and/or blocks. Header data and other container related data of the content may be stored in one location (e.g., or file). The media data (e.g., video frames, audio frames) of the content may be subdivided into user-specific portions and common portions. The common portions may be accessible by a plurality of user accounts. The user-specific portions may be limited to a user account. For a specific content channel (e.g., or asset), the content may be stored as a single common portion and corresponding user-specific portions (e.g., for each user storing the content). The user-specific portions may be determined using one or more selection rules, such as a randomization function. The remaining bytes of the content may be stored in the common storage. The user-specific storage may have index files to allow for the location and reconstitution of the content based on the user-specific portion, the common portion, the header data, and/or the like.

Figure 1:
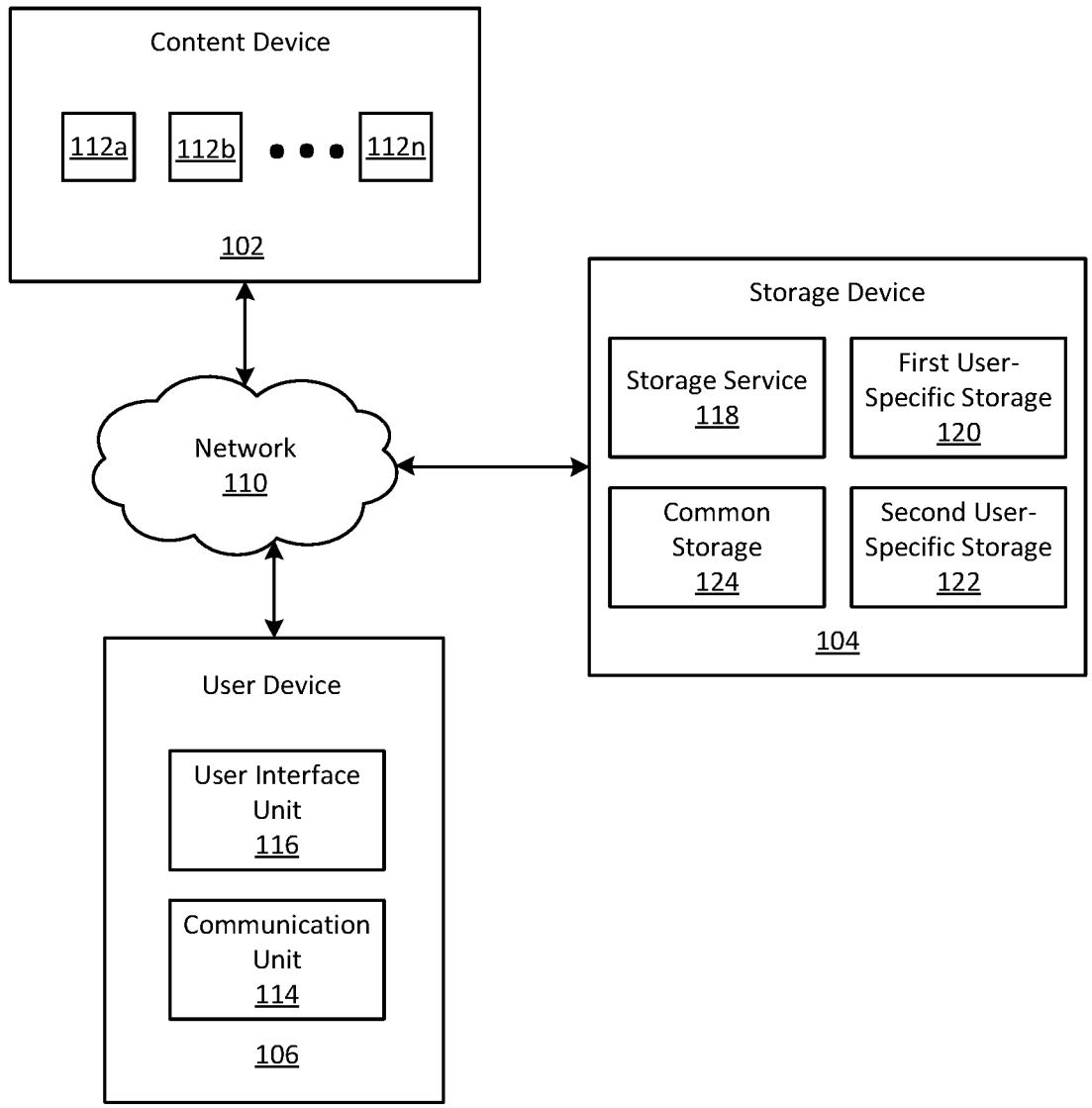
FIG. 1 is a block diagram showing an example operating environment.

FIG. 1 is a block diagram showing an example system 100 for providing content. The system 100 may comprise one or more of a content device 102, a storage device 104, and a user device 106. The content device 102, the storage device 104, and the user device 106 may be communicatively coupled via a network 108.

The network 110 may comprise a content distribution and/or access network. The network 110 may facilitate communication via one or more communication protocols. The network 110 may comprise fiber, cable, a combination thereof. The network 110 may comprise wired links, wireless links, a combination thereof, and/or the like. The network 110 may comprise routers, switches, nodes, gateways, servers, modems, and/or the like.

The content device 102 may be configured to send content 112 to a plurality of users. The content 112 may comprise video data, audio data, closed caption (CC) data, a combination thereof, and/or the like. The content 112 may comprise a plurality of content channels (e.g., 112a, 112b, and up to 112n), such as live channels, streaming channels, cable channels, and/or the like. The content device 100 may comprise one or more servers. The content device 100 may be one or more edge devices of a content distribution network and/or content access network. The content device 100 may comprise a transcoder configured to encode, encrypt, compress, and/or the like the content. The content device 102 may comprise a packager configured to package the content, segment the content, and/or the like. The content device 102 may send the content as a plurality of packets, such as transport stream packets, Moving Picture Experts Group (MPEG) transport stream packets, and/or the like. The content device 102 may send the content 112 to the storage device 104.

The user device 106 may be configured to receive the content 112 from one or more of the content device 102 or the storage device 104. The user device 106 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 106 may be configured to receive the content via a communication unit 114. The communication unit 114 may comprise a modem, network interface, and/or the like configured for communication via the network 110. The user device 106 may comprise a user interface unit 116. The user interface unit 116 may be configured to cause display of a user interface. The user interface may be configured to allow the user to browse available content, such as content sent by the content device 102, content stored by the storage device 104, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

The storage device 104 may be configured to store content, such as content recorded from a content channel, a content asset, and/or the like. The storage device 104 may store the content for a plurality of users. The storage device 104 may comprise a storage service 118 configured to store and/or manage storage of the content. The storage device 104 may be configured to send the stored content (e.g., after reconstituting the content) upon requests from the user device 106.

The storage service 118 may be configured to subdivide (e.g., deconstruct, divide) content into a plurality of portions for storage. Subdividing may include separating data into separate blocks, copying a single block as multiple separate blocks, and/or the like. The storage device 104 may receive the content from the content device 102. The content may be received as a plurality packets, such an internet protocol packets, transport stream packets, and/or the like. A packet may comprise one or more sections (e.g., segments, frames, blocks) of content. A section of content may comprise a plurality of frames of content. The storage service 118 may be configured to subdivide a section of content and/or a frame of content into the plurality of portions. The storage service 118 may be configured to subdivide each section of the content into a corresponding plurality of portions of the content. The storage service 118 may be configured to subdivide the content on a per user basis. The storage service 118 may be configured to subdivide the content such that the plurality of portions are different or the same for different users (e.g., for the same content).

The storage service 118 may be configured to subdivide content multiple times. The content may comprise header data and media (e.g., video, audio, bit stream) data. The content may be subdivided into a header portion comprising the header data and a media portion comprising the media data. The media portion may be subdivided into a first portion (e.g., a user-specific portion and a second portion (e.g., remaining portion, common portion).

The content (e.g., media portion, or section of the media portion) may comprise a bit sequence (e.g., an ordered sequence of bit values). The bit sequence may comprise encoded data, such as an entropy encoded data sequence, a context-adaptive binary arithmetic coding (CABAC) data sequence, a context-based adaptive variable-length coding (CAVLC) data sequence, and/or the like. The bit sequence may comprise encoded content separated from header data. The bit sequence may comprise one or more frames of the content.

The storage service 118 may determine the first portion and/or the second (e.g., for a specific section of content). The storage service 118 may determine the first portion and/or the second portion using a variety of techniques, such as the techniques shown in FIGS. 3A-D. The storage service 118 may determine the first portion and/or the second portion based on one or more selection rules, such as a predefined rule, a randomization function, and/or the like. The predefined rule may be any rule and/or function for determining the first portion and/or second portion.

The storage service 118 may determine the first portion based on a randomized selection of bits of the bit sequence. The randomized selection of bits may be bits matching a randomized data range (e.g., or other criteria, such a list of random numbers corresponding to an index of the bit sequence). The randomized data range may be generated using a randomization function (e.g., a random number generator, an algorithm or service that produces a random or pseudo-random number, for example, based on a seed). A random number may be generated and used to determine a number of digits or bits of the sequence that are within the range. If the random number is X, then the randomized data range may comprise the first X amount of bits of the bit sequence (e.g., for a frame), the last X amount of bits of the bit sequence, X number of bits beginning at an offset (e.g., randomized offset), and/or the like.

The randomization function may be applied (e.g., deterministically, to achieve the same result) for different users. The random number (e.g., or randomized data range) may be the same for each of a plurality of users (e.g., for a specific section of content). The randomization function may result in selection of different first portions and/or second portions for different sections of content.

For a first section of content, the first portion may be different than for a second portion of content. For purposes of illustration, the media data may comprise a first section of 100 bits and a second section of 100 bits. It should be understood that a typical bit sequence may be much longer (e.g., 160 bytes), but the example is used only for ease of explanation. If the storage service 118 determines a randomized data range of 10 bits for a first section, then the first portion associated with the first section may comprise the first 10 bits of the first section. The second portion may comprise the last 90 bits of the first section. If the storage service 118 determines a randomized data range of 15 bits for the second section, then the first portion associated with the second section may comprise the first 15 bits of the second section. The second portion may comprise the last 85 bits of the second section.

The first portion and/or section portion may be determined based on a constraint (e.g., parameter), such as a size, an amount, a ratio, a percentage, and/or the like associated with a section (e.g., or segment) of content. The constraint may indicate an amount of data (e.g., data bits, data blocks, data bytes) in the first portion, such as a minimum amount, maximum amount, range of the amount, and/or the like. The constraint may indicate an amount data (e.g., data bits, data blocks, data bytes) in the second portion, such as a minimum amount, maximum amount, range of the amount, and/or the like. The constraint may indicate an amount data from a section of content to include in the first portion and/or an amount data from the section to include in the second portion. The constraint may indicate that the first portion must be equal to or less than about 10%, about 5%, about 2%, about 1%, and/or the like of the section of content. The constraint may indicate that the second portion must be greater than or equal to about 90%, about 95%, about 98%, about 99%, and/or the like of the section of content. The constraint may indicate that the second portion and the first portion must be in a ratio of about 9 to about 1, about 8 to about 2, about 95 to about 5, about 98 to about 2, about 99 to about 1, and/or the like of the section of content. The constraint may be an average constraint, such that the first portion and second portion must be determined according to the constraint on average over multiple sections of content.

The constraint may be based on a characteristic of the content, such as size of the content, amount of motion in the content, type of frame in the content, a combination thereof, and/or the like. The constraint may be based on a size of a portion of content that a user device is expected to request. If the user device requests one segment (e.g., a 2 second segment comprising 48 frames) at a time, then the constraint may be based on a size of the segment.

The storage service 118 may store the first portions in user-specific storage. User-specific storage associated with a first user may comprise first user-specific storage 120 (e.g., a first location, first volume, first directory, first file, first grouping of files). User-specific storage associated with the second user may comprise second user-specific storage 122 (e.g., a second location, second volume, second directory, second file, second grouping of files). The first user-specific storage 120 may be different than the second user-specific storage 122. Permissions may be used to restrict users to access user-specific storage associated with the corresponding account. The first user-specific storage 120 may be associated with a first account. The second user-specific storage 122 may be associated with a second account. The first account may not have permission to access the second user-specific storage 122. The second account may not have permission to access the first user-specific storage 120.

The storage service 118 may be configured to store a copy of the first portion in the first user-specific storage 120. The storage service 118 may be configured to store another copy of the first portion in the second user-specific storage 122. The copy of the first portion stored in the first user-specific storage 120 may be identical to the copy of the first portion in the second user-specific storage 122. The storage service 118 may be configured to store a copy of the first portion from the first section and a copy of the first portion from the second section in first user-specific storage 120 and/or the second user-specific storage 122.

The storage service 118 may be configured to store the second portion (e.g., or second portions from each section) in common storage 124. A plurality of second portions (e.g., from different sections of content) may be stored as one file, or as separate files, or a combination thereof. The second portion may be stored with randomized data. Randomized data (e.g., one or more random bits or bytes) may be prepended, appended, inserted within, and/or the like the second portion. The second portion (e.g., for each section) may be stored only once for a plurality of users. A second portion (e.g., for a section of content) may be stored in the common storage for a first user account. The same copy of the second portion may also be used (e.g., referenced) for a second user account.

In some scenarios, the content (e.g., a content item) may have one or more versions of the content. Different versions of the one or more versions may be associated with (e.g., or sent to, stored for) different users. The one or more versions may correspond to different bit rates, encodings, device specific formatting, and/or the like. The one or more versions may comprise different watermarking data. The differences from one version of the content to another may be stored in user-specific storage. The common storage 124 may comprise portions of the one or more versions of the content that are the same. In addition or in the alternative, the common storage 124 may comprise a plurality of versions of the content. For a frame, different versions of the frame may be stored in the user-specific storage and/or the common storage 124. The one or more versions may comprise differences in slice, variations of an area within a picture, a combination thereof, and/or the like. A portion of content (e.g., a last frame of a set of frames, such as packet of frames) may be modified to generate the one or more versions of the content. Randomized bytes may be added to generate the one or more versions of content, versions of a set of frames, versions of a frame, and/or the like. Different users may access different version of the one or more versions to determine the content.

The storage service 118 may be configured to generate data for determining (e.g., reconstituting) the stored content. The data for determining the stored content may comprise an identifier of the first portion, a location of the first portion, an identifier of the second portion, a location of the second portion, an ordering of the first portion and second portion, and/or a combination thereof. The data for determining the stored content may comprise an association of the first portion and the second portion. The data for determining the stored content may be stored as a record in an index (e.g., or other data structure). If a section of content comprises K number of frames, the index may comprise K records. Each of the K records may comprise data for determining a corresponding frame of the section.

The data for determining the content (e.g., or frame) may comprise information for determining a portion of the content (e.g., the first portion) stored in user-specific storage, information for determining the portion of the frame stored in common storage, and/or the like. The data for determining the content may comprise data indicating X bits (e.g., or bytes) from the user-specific storage (e.g., corresponding to the first portion). The data for determining the content may comprise data indicating Y bits (e.g., or bytes) from the common storage 124 (e.g., corresponding to the second portion). The data for determining the content may comprise an association of the X bits and the Y bits (e.g., and instructions for recombining them). The data for determining the content may comprise a location, directory, file, bit offset, byte offset, and/or the like for locating the X bits and/or the Y bits.

The data for determining the content may be stored in the user-specific storage. The data for determining the content may be stored in an index file, a database, a document, a manifest, a data structure (e.g., XML, JSON, HTML), and/or the like. First data for determining the content may be stored in the first user-specific storage 120. Second data for determining the content may be stored in the second user-specific storage 122. If a request to access the content (e.g., or the frame) associated with the first user account is received, then the first data may be used to determine (e.g., reconstitute) the content. The first data may be accessed based on a user credential associated with the first user account. If a request to access the content (e.g., or the frame) associated with the second user account is received, then the second data may be used to determine the content. The first data may be accessed based on a user credential associated with the second user account.

The storage service 118 may be configured to process requests for the stored content. The storage service 118 may determine (e.g., reconstitute) sections of the content in response to requests for the corresponding sections. The storage service 118 may be configured to determine the content (e.g., or sections of content) based on the stored data for determining the content. The content (e.g., or section of content) may be determined by combining the first portion stored in user-specific storage (e.g., or common storage) and the second portion stored in the common storage 124. The X bytes from the user-specific storage may be combined with the Y bits from the common storage 124. The data structure for reconstituting the frame may be used to determine the specific data to recombine. The Y bits may be appended to the X bits (e.g., if the user-specific portion is from the beginning of the bit sequence).

The storage service 118 may be configured to locate the data for determining the content based on a user account (e.g., associated with a request for the content). The user account may be associated with a specific user-specific storage, user-specific storage area, and/or the like. A database may be used (e.g., by the storage service 118) to associate user accounts with corresponding user-specific storage. A database may be used (e.g., by the storage service 118) to associate user accounts with corresponding content recording information. The content recording information may comprise an identifier (e.g., or location) of user-specific storage, an identifier for data for determining the content, and/or the like. Upon receiving a request, the storage service 118 may determine (e.g., based on the association) the corresponding user-specific storage for a user account, the data for determining the content, and/or the like. The storage service 118 may access the user-specific storage (e.g., or other location, such as a database) to determine the data for determining the content. The data for determining the content may comprise an index, one or more entries in an index, and/or the like stored in the user-specific storage. The data for determining the content may comprise one or more entries in a database that may be determined based on a user account identifier, a content recording identifier, and/or the like.

The storage service 118 may use the data for determining the content to determine a location of a first portion of the content. The first portion of the content may be copied into memory. The storage service 118 may use the data for determining the content to determine a location of the second portion of the content. The second portion may be copied into memory and added to (e.g., appended to, combined with) the first portion to form a section (e.g., segment of content). The section of content may be sent to a user device 106 requesting the content. The request may be specific to the section of content. If the user device 106 requests a section (e.g., such as a 2 second segment of content) of content, the section of content may be determined and sent to the user device 106. The first portion and second portion may be combined as a media portion (e.g., CABAC encoded data). The media portion may be combined with a header portion (e.g., by appending the media portion to the end of the header portion). The combined header portion and media portion may be sent to the user device 106 (e.g., as a single section and/or segment of content). After receiving the requested section, the user device 106 may request (e.g., using a manifest) the next section of content. The process for determining the next section may then be performed. In some scenarios, multiple first portions and second portions (e.g., first portion 1, second portion 1, first portion 2, second portion 2) may be combined by the storage service 118. The multiple combined portions may be sent to satisfy a request for a section (e.g., segment) of content.

In some scenarios, the content may comprise watermarking data, such as an additional frame that is added to content, an additional set of data added to a bit sequence, and/or the like. The watermarking data may identify a user account that is accessing and/or requesting the content. The watermarking data may be stored in the user-specific portion. The data for determining the content may comprise data indicating the watermarking data.

Figure 2:
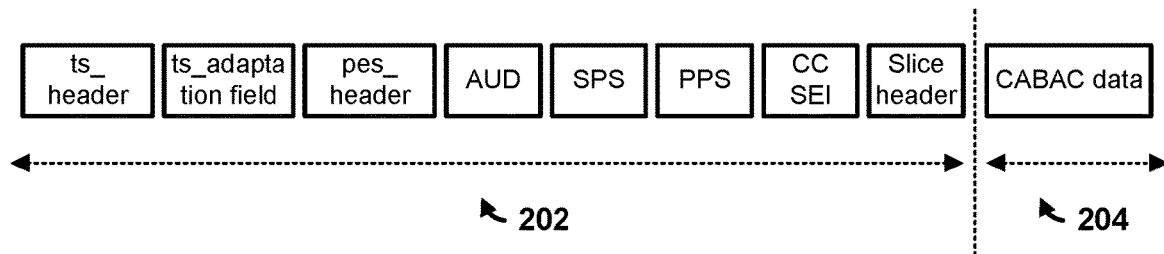
FIG. 2 is a diagram showing example content structure.

FIG. 2 is a block diagram showing example content. The content may comprise a media sequence, content sequence, bit sequence, and/or the like. The content may be divided into a plurality of portions, such as bit segments, byte segments, blocks (e.g., macroblocks), and/or the like. The content may comprise a plurality of packets, such as media transport stream packets. An example packet may comprise headers and adaptation field data.

The content may comprise a plurality of packets, such as transport stream packets, MPEG-2 transport stream packets, and/or the like. The content may be subdivided (e.g., divided, deconstructed, segmented) into one or more header portions 202 (e.g., a first bit sequence, a first file) and one or more second non-header portions 204 (e.g., second bit sequence, a second file). The header portions 202 may comprise header data, adaption field data, and/or the like. The non-header portion may comprise the data that remains after removing some or all of the headers. The non-header portion may comprise media data. The media data may comprise one or more sections, segments, frames, blocks, and/or the like. The media data may be subdivided into one or more first portions (e.g., stored in user-specific storage) and one or more second portions (e.g., stored in common storage).

An example header portion 202 may comprise container/systems-specific data. The header portion 202 may comprise header data. The header portion 202 may comprise one or more headers for decoding the content. Several example headers are shown in FIG. 2 for purposes of illustration, but it should be understood that other headers may be used. For MPEG-2 TS, the header portion 202 may comprise systems metadata such as PAT, PMT, CAT, SCTE 35, EBIF, and/or the like. The header portion 202 may comprise one or more PES headers. For ISO-BMFF, the header portion 202 may comprise one or more (or all) ISO-BMFF boxes from the beginning of each fragment within the media file (e.g., start of 'ftyp' or ' styp' boxes) and till the end of the header of the 'mdat' box (e.g., till the first byte of the bitstream). For H.264 and H.265 video, the header portion 202 may comprise one or more (or all) non-VCL NAL units, one or more (or all) NAL headers of non-VCL NAL units, and/or the like. The header portion 202 may comprise slice headers of NAL units comprising slices.

The media portion 204 may comprise image data, video data, audio data, and/or the like. The media portion 204 may comprise bitstream data. The media portion 204 may comprise CABAC-coded data in case of H.264 and H.265. The media portion 204 may comprise a pixel-specific data, such as a pixel-specific sequence bitstream.

The process of deconstructing, subdividing, and/or the like of content described herein may be applied to non-NAL data, non-video media, audio data, and/or the like. For (E-)AC-3 the syncframe( ) and bsi( ) syntactic elements may be stored in the container-specific storage. The audblk( ), auxdata( ), and errorcheck( ) syntactic elements may be deconstructed into first portions (e.g., for user-specific storage) and second portions (e.g., for common storage).

As described in more detail elsewhere herein, the header portion 202 may be stored in user-specific storage and/or common storage. The header portion 202 may be stored in container-specific storage. The container specific storage may be stored in the user-specific storage, the common storage, a combination thereof, or a separate storage. The container-specific storage may be specific to a type of container associated with the content. Data, such as an index, may be stored for determining the content based on the header portion 202 and the media portion 204. One index may be stored for determining a media portion 204 based on first portions and second portions. Another index may be stored for determining a packet based on a header portion 202 and a media portion 204.

As shown in FIGS. 3A-D, the media portion 204 may be subdivided into a first portion 302 and a second portion 304 in a variety of ways. The first portions 302 and/or the second portions 204 may be stored in a single file (e.g., as a bit sequence) or multiple separate files. It should be understood that regardless of whether the first portions 302 are shown as separate or combined, the first portions 302 may be stored as a single file or as multiple files. It should be understood that regardless of whether the second portions 304 are shown as separate or combined, the first portions 302 may be stored as a single file or as multiple files. The first portions 302 may be stored as a single file on a per segment basis (e.g., or per section basis). The second portions 304 may be stored as a single file on a per segment basis (e.g., or per section basis). A segment (e.g., or section) may comprise a 2 second portion of content comprising, for example, 48 frames. Each segment may have an associated file (e.g., in user-specific storage) that stores the first portions 302. Each segment may have an associated file (e.g., in common storage) that stores the second portions 304.

Figure 3A:
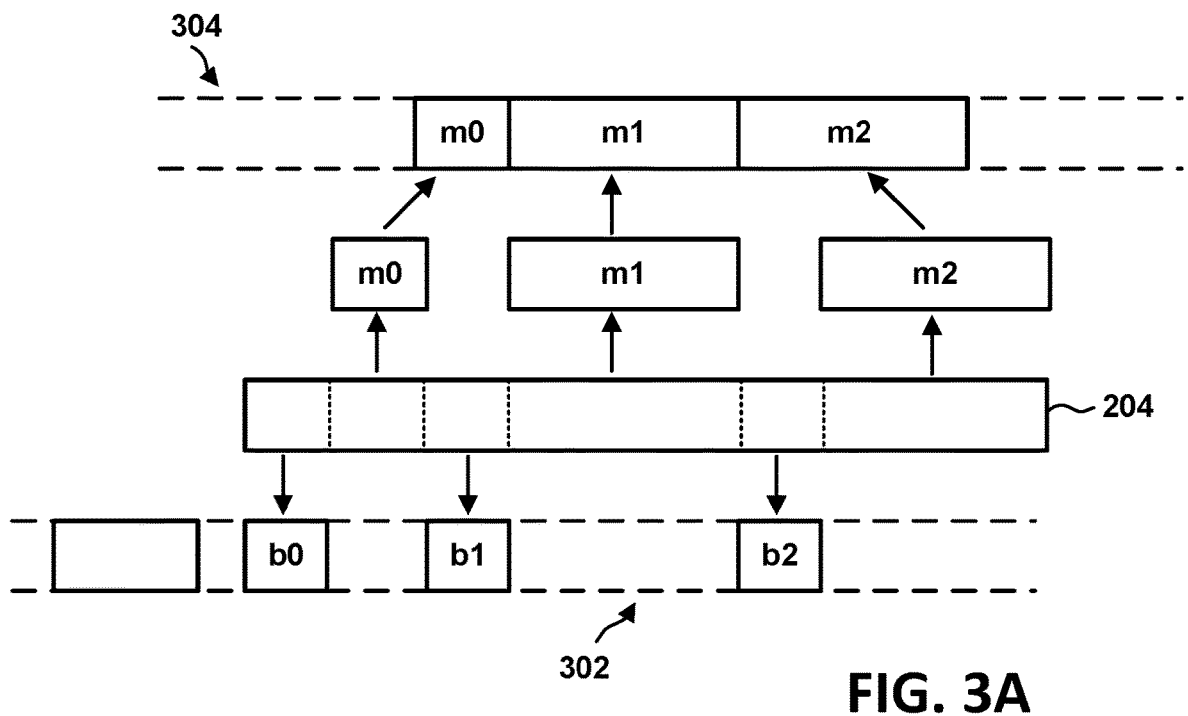
FIG. 3A is a diagram showing example content storage.

FIG. 3A shows an example storing of first portions 302 and second portions 304. The first portion 302 may be stored in user-specific storage. The second portion 304 may be stored in common storage associated with a plurality of user accounts. The first portion 302 may comprise a portion of a bit sequence. The first portion 302 may be determine based on one or more selection rules. The one or more selection rules may comprise any rule, function, logic, and/or algorithm for determining (e.g., selecting) portion of content (e.g., a portion of the bit sequence). The one or more selection rules may comprise a predefined rule for determining specific bits of the bit sequence. The one or more selection rules may comprise a randomization function that randomly selects content. The one or more selection rules may be applied deterministically, such that the same portions of content are selected for each user. The first portion 302 may be the same for different users storing the same content. A randomized sequence of bits may be determined using the randomization function to randomly select numbers in a sequence. After the randomized sequence of bits is determined, the randomized sequence of bits may be applied to each user in the same manner to determine the same user-specific portion for each user.

The one or more selection rules may vary in result for different portions of the content. The size (e.g., or number of bytes, bits) of the first portion 302 may be randomly determined for each of a plurality of sections of content (e.g., on a per segment, per macroblock, and/or per frame basis). A number of bits of the first portion may be based on a predefined number. A random number, R0, may be added to the predefined number to determine a randomized bit range. If the predefined number is X, the first at least X+R0 bytes of a data portion (e.g., of a frame, of the second portion 204) may be copied as a first portion 302. The first portion 302 (e.g., X+R0, which may be media data, such as CABAC coded data) may be copied into a file (e.g., as block b0 of a file as shown in FIG. 3A) in user-specific storage. The file may comprise other first portions (e.g., associated with the user) of the content. The file may comprise only the first portions of the content.

The selection rules (e.g., or randomization function) may comprise a randomization constraint. The randomization constraint may constrain selection of random information (e.g., random numbers, random byte ranges, randomized data added to the first portion and/or second portion). The random information may be constrained to match a probability distribution. A random number, R1, may be determined. R1 bytes of the content may be copied into the user-specific storage as block b1. Additional blocks of data may be copied into corresponding portions of the user-specific storage and the common storage until the content is completely stored (e.g., all frames of the content have been stored). The random numbers R0 and R1 (e.g., and other randomly determined information) may have an associated probability distribution. The probability distribution may be defined to tune the size and/or security of the blocks of data stored in the common portion. The random number may be determined based on the formula R=N+r where r is a Gaussian-distributed random number, and N is a constant.

Figure 3B:
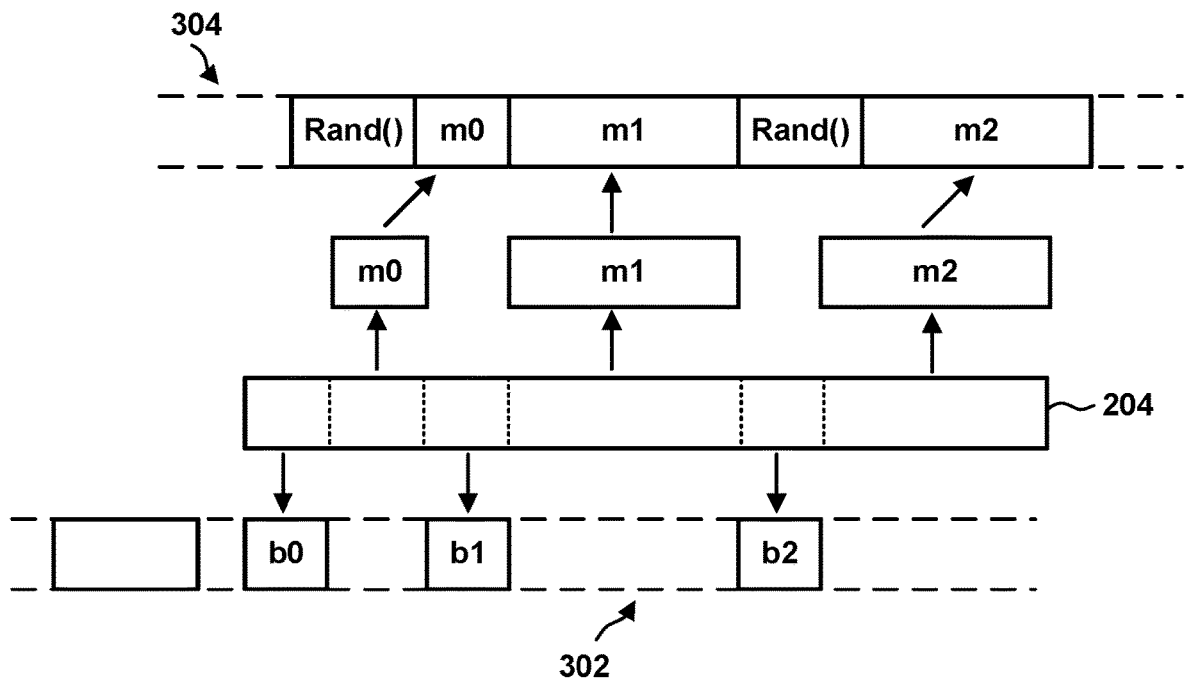
FIG. 3B is a diagram showing example content storage.

FIG. 3B shows another example storing of first portions 302 and second portions 304. The first portions 302 may be determined using the one or more selection rules (e.g., as in FIG. 3A). The first portions 302 may be stored in the user-specific storage. The second portions 304 may be stored in the common storage. Additional data may be added to the second portions 304 and/or common storage (e.g., to cause the stored data to be more difficult to decode). Random amounts of random bits (e.g., or bytes, shown as Rand( ) may be stored in the common storage (e.g., along with the second portions). The random bits may be stored in a sequence between one or more second portions 304, before a first one of the second portions 304, following a last one of the second portions 304, and/or a combination thereof. One or more of the data blocks (e.g., of the second portions 304) copied to the common storage may modified, encoded, and/or the like. A block may be further XOR'ed with a number. The number may be stored in the file in the common storage.

In some scenarios, the stored content may be the same or similar for different users. A first user and a second user may both request to store the same content (e.g., the same frame of content, same content asset). If content is being stored in common storage for the first user, the content can be compared to stored content (e.g., prior stored content) associated with the second user also stored in the common storage. A single content asset may have one file for storing the common portion for a plurality of different users. A signature associated with the content (e.g., or a part of the content such as a frame) may be compared to a signature of the content already stored for the second user. An example signature may comprise an MD5, SHA-1, SHA-3, and/or other signature. Signatures may be stored (e.g., in a database) for the header portion (e.g., header data, container-specific portion) and/or the common portion. The stored signature may be compared to a computed signature (e.g., computed based on the content associated with the first user). A signature associated with the header portion may be compared to one or more stored signatures. If an identical signature is not found, the content may be stored. In some scenarios, the content stored for different users may be the same. A header for one user may be the same as a header for another user. The content associated with the header may differ for different users according to formatting (e.g., container formatting), device content requirements, and/or the like.

The user-specific storage may comprise one or more files associated with the content. The user-specific storage may comprise metadata on the stored content (e.g., media sequence). The user-specific storage may comprise blocks containing user-specific bytes. The user-specific storage may comprise instructions for determining the content (e.g., a media sequence, section) from the combination of the first portion (e.g., container-specific portion) and the second portion (e.g., user-specific portion, the common portion).

If a user requests access to the content, the content may be determined (e.g., reconstructed) using the first portions 302 and the second portions 304. The instructions for determining the content may comprise an indication and/or location of a first portion 302. The instructions may comprise an indication and/or location of a second portion 304. The instructions may comprise an ordering of the first portion 302 and the second portion 304. The instructions may comprise one or more indications to skip the additional data. The instructions may comprise a first instruction (e.g., access X bytes starting at location B in a bit sequence) to access the first portion 302 in the user-specific storage, a second instruction (e.g., skip Y bytes starting at location R in a file in common storage) to skip the additional data stored in the common storage, a third instruction (e.g., access Z bytes starting at location M in a bit sequence) to access the second portion 304 in the common storage, and/or a combination thereof. The second instruction may be ordered (e.g., in an index) after the first instruction. The third instruction may be ordered after first instruction and the second instruction. The content, such a section (e.g., or segment, 2 second segment), may be reconstituted by following the first instruction, the second instruction, and/or the third instructions. In some implementations, the second instructions may be omitted (e.g., because accessing the location of the second portion 304 results in skipping the additional data). The content may be reconstituted by a server device and/or a user device.

Figure 3C:
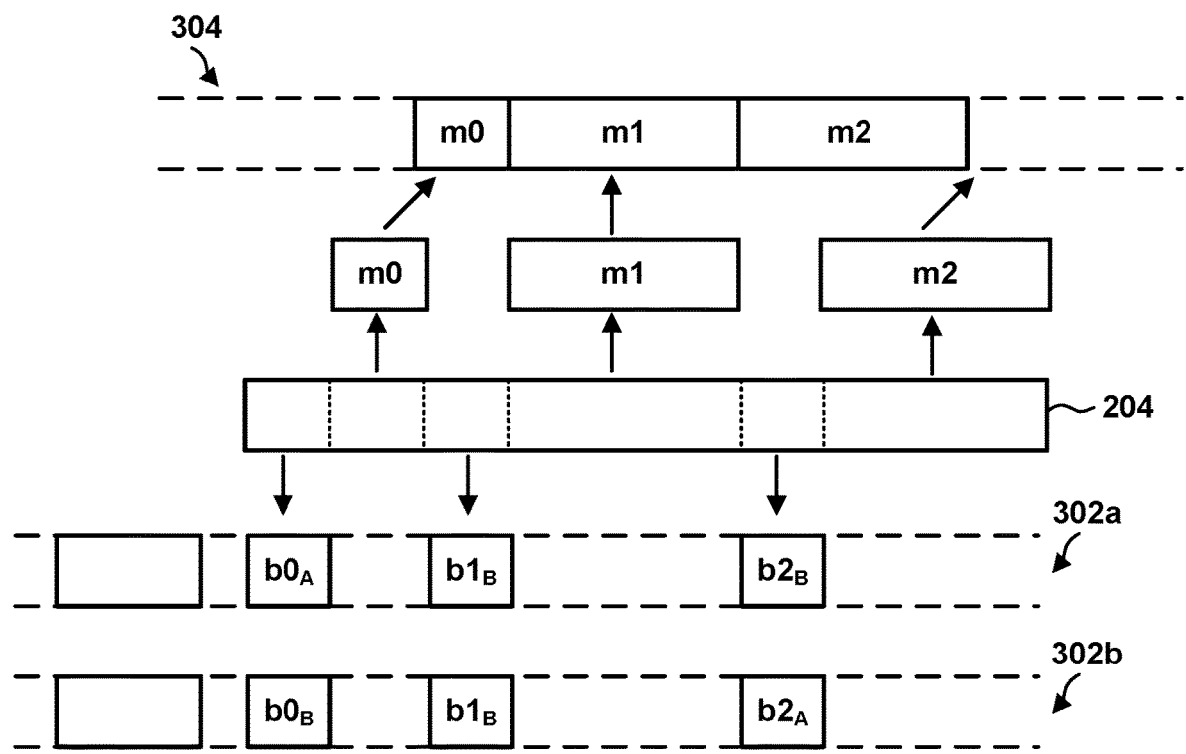
FIG. 3C is a diagram showing example content storage.

FIG. 3C shows another example of storing of first portions 302 and second portions 304. The content may be stored using watermarking or similar techniques. For a particular content item (e.g., content stream), the content item may be encoded as at least two versions of the content. The at least two versions of the content may be similar (e.g., or near identical) but may be different based on a difference in watermarking information. The watermarking information may comprise any type of information. The watermarking information may comprise, for example, data added to a frame. The watermarking information may be added to only one frame of a section (e.g., segment, 2 second segment of 48 frames). Though FIG. 3C only shows a single representation of the media portion 204 of the content, it should be understood that for different user accounts, the second portion may be different (e.g., based on the watermarking information).

The one or more selection rules may be used to determine which portions of the content are stored as user-specific content. The one or more selection rules may be applied (in a deterministic manner) such that the common portion is the same for different user accounts. The one or more selection rules may be applied (in a deterministic manner) such that the user-specific portions vary only based on the watermarking information.

As shown in FIG. 3C, the one or more selection rules may be used to determine a first portion 302a for user-specific storage associated with a first user account. The one or more selection rules may be used to determine a first portion 302b for user-specific storage associated with a second user account. The one or more selection rules may be used to determine the same common portion (e.g., m0, m1, m2) for both the first user account and the second user account.

The system may vary which of the at least two version of content are associated with (e.g., stored for) a user account. Which of the at least two versions of the content are received may vary on a section-by-section (e.g., segment-by-segment, frame-by-frame) basis. The version of the content for a section of content may be selected and/or determined randomly. As each section of content varies randomly for each user, a plurality of different copies of the content (e.g., which vary differently based on watermarking information, on a segment-by-segment basis) may be stored for a plurality of user accounts.

For a first section (e.g., or segment), a first user account may be associated with a first version of the content comprising first watermarking information (e.g., indicated with an "A" subscript in FIG. 3C). For a second section (e.g., or segment), the first user account may be associated with a second version of the content comprising second watermarking information (e.g., indicated with a "B" subscript in FIG. 3C). FIG. 3C shows a scenario in which the first user account the stores first portion b0 based on content version A, first portion b1 based on content version B, and first portion bn based on content version B. This scenario also shows that the second user account the stores first portion b0 based on content version B, first portion b1 based on content version B, and first portion bn based on content version A. It should be understood that this scenario is not limiting but is only one of many other scenarios which may result implementing the disclosed approach. Whether the first watermarking information or the second watermarking information is selected for a section may be determined randomly. By randomly selecting between the first watermarking information and the second watermarking information for each user may result in random and/or uniquely copies of content (e.g., different combinations of the first portions) stored in user-specific storage for different users.

Figure 3D:
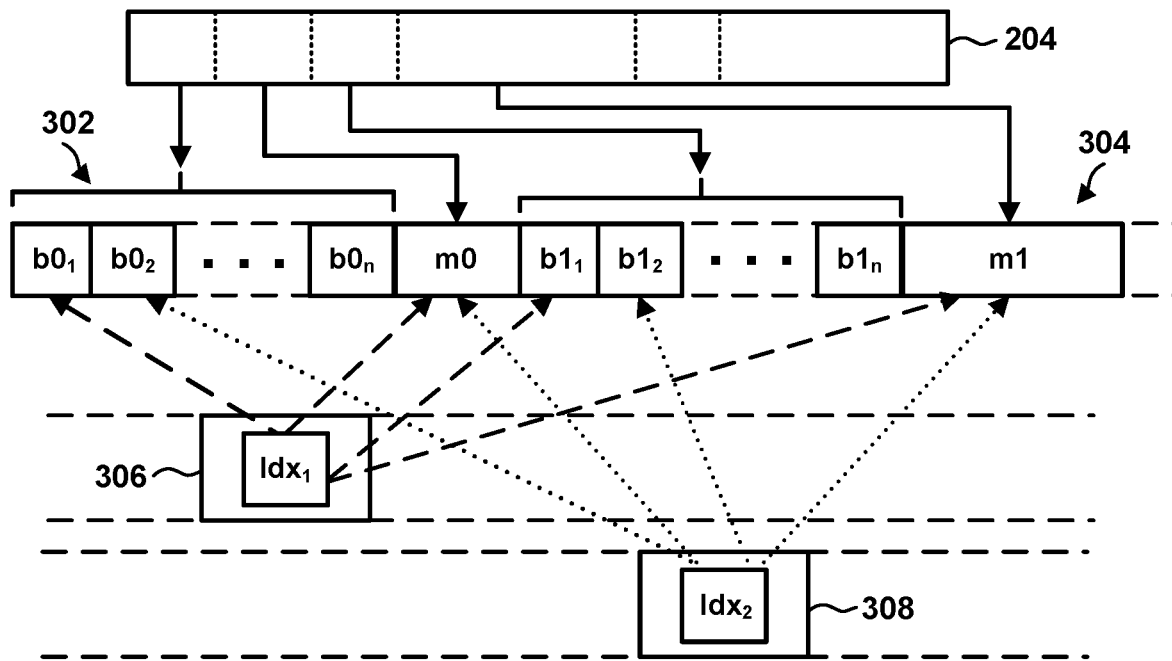
FIG. 3D is a diagram showing example content storage.

FIG. 3D shows another example of storing of first portions and second portions 304. The content 204 may be stored such that the user-specific storage may reference duplicated portions of content in the common storage. The content 204, such as the media portion of the content, may be subdivided into a first portion 302 and a second portion 304. The first portion 302 may be determined (e.g., using one or more selection rules). The second portion 304 may be a remaining portion that does not include the first portion 302. Both the first portion 302 and the second portion 304 may be stored in common storage (e.g., as bytes in a common file).

The first portion 302 may be stored redundantly in the common storage (e.g., as bytes in the common file). The redundant copies of the first portion 302 may be duplicated N times. N may be the number of users storing the content, a predetermined number, and/or the like. The redundant copies of the first portion 302 may be stored in the same file, bit sequence (e.g., sequentially in the bit sequence), and/or the like. The redundant copies of the first portion 302 may be separated by random amounts of random data.

An index file (e.g., $Idx_1$, $Idx_2$, $Idx_n$) may be stored in user-specific storage (e.g., of each user). The index file may be unique to each user (e.g., at least to a portion of users). The index file may reference a specific redundant copy (e.g., $b0_1$, $b0_2$, $b0_n$) of the user-specific portion stored in the common storage. The number of redundant copies of the user-specific portion stored in the common storage may be less than a number of a plurality of user accounts associated with storing the content. The index file may reference the common portion (m0). The dashed lines with arrows in FIG. 3D indicate that an index file references (e.g., includes a location to access) the first portion 302 and the second portion 304. As shown in FIG. 3D, a first user may have an associated first user-specific storage 306 comprising a first index file. A second user may have an associated second user-specific storage 308 comprising a second index file. A third user may have an associated second user-specific storage 310 comprising a first index file. The first user, second user, and third user may each be associated with different (e.g., unique) copies of the content. The user-specific portion for each of the copies of the content may be different and/or unique. The data stored in the first user-specific storage 308 may be different from the data stored in other user-specific storages (e.g., based on the index files referring to different first portions).

An index file may comprise an instruction to skip one or more of the redundant copies of the first portion 302 stored in the common storage. The index file may comprise an instruction to skip random bytes in the common storage. The index file may comprise an instruction to skip redundant copies of first portion 302, access the copy of the first portion associated with the user, and/or access the common portion associated with the user.

An example data file (e.g., video stream data, bit stream data, video data, audio data) can be stored for a plurality of users. The data file can comprise a CABAC-coded file. For purposes of illustration, the data file can comprise 100 bytes, but it should be understood that any file size can be used. N may be selected as 20 bytes, starting at byte O. M would then be selected as the remaining 80 bytes (e.g., 100-20). The first 20 bytes may be copied in to a file in the common storage 42 times (e.g., or any other number). Following these 42 copies, the remaining 80 bytes may be stored in the file. The file may comprise 920 bytes.

For user accounts u=0 . . . 41, a byte range may be calculated as [u*20, (u+1)*20)], which is the u-th 20-byte range. This byte range (e.g., as $b0_{1-n}$, $b1_{1-n}$) or data indicative of this byte range (e.g., if stored in common storage) may be copied into common storage. Data indicating the location of a corresponding byte range may be stored in the user-specific storage for a corresponding user account. Remaining portions of the content not included in the byte range may be stored in the common portion (e.g., along with copies of the byte range). For user account 0, the byte range may comprise [0,20]. In user-specific storage associated with user account 0, a record may be stored indicating an instruction to access the [0,20] byte range from common storage. For user account 1, the byte range may comprise [20, 40]. In user-specific storage associated with user account 1, a record may be stored indicating an instruction to access the [20,40] byte range from common storage.

The records may be stored in corresponding indexes associated with the first user account and/or the second user account. An index may comprise a "skip" instruction for the first u*20 bytes, a "copy from user-specific storage" instruction for 20 bytes, a "skip" instruction for (42−u+1)*20 bytes, a "copy from the common portion" instruction for last 80 bytes, or a combination thereof. These instructions may be used to determine (e.g., or reconstitute) the content by combining the corresponding first portions (e.g., b0, b1, b2) and second portions (e.g., m0, m1, m2, etc.) for a plurality of sections of the content. It should be understood that different users may have different index files that copy, access, and/or skip different portions of the redundant copies of the user-specific portion.

It should be appreciated that the one or more of the aspects shown in FIGS. 3A-D may be combined. For example, an aspect shown in FIG. 3B may be combined with any one of the aspects of FIGS. 3A, 3C, and/or 3D. An aspect shown in FIG. 3C may be combined with any one of the aspects of FIGS. 3A, 3B, and/or 3D. An aspect shown in FIG. 3D may be combined with any one of the aspects of FIGS. 3A, 3B, and/or 3C. The watermarking techniques associated with FIG. 3C may be used in combination with the randomized additional data techniques associated with FIG. 3B.

Figure 4:
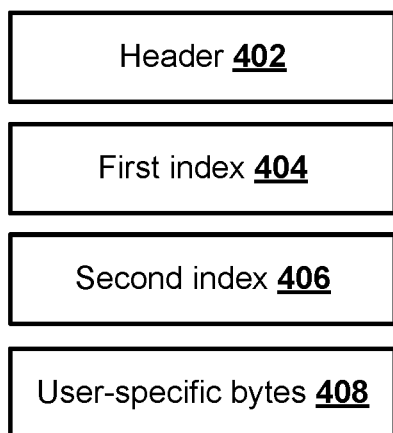
FIG. 4 is a diagram showing example content storage.

FIG. 4 shows an example implementation of a user-specific storage format. The user-specific storage format may be used to store user-specific data as one or more files. The user-specific data may be associated with a specific content recording, content asset, content channel, a user associated with the recording, a combination thereof and/or the like. The user-specific data may comprise a header 402, a first index 404, a second index 406, user-specific bytes 408 (e.g., user-specific portion of the content), a combination thereof, and/or the like.

The header 402 may comprise data (e.g., metadata) indicating the syntax of one more indices, such as the first index 404 and the second index 406. The syntax data indicating the syntax may comprise one or more field identifiers, field lengths, hash and encryption algorithms, hashes data (e.g., hashes of the contain-specific portion, hashes of the common portion), encryption keys, key identifiers, initialization vector (IV), additional authenticated data (AAD), a combination thereof, and/or the like.

The first index 404 may be associated with and/or comprise data related to one or more media portions of the content, such as first portions stored in user-specific storage and second portions stored in common storage. The first index 404 may comprise a plurality of entries (e.g., or records). An entry may comprise one or more fields, such as a number of bytes to copy from the user-specific bytes 408, number of bytes to copy from the common storage (e.g., bytes from a corresponding common file in the common storage), a number of times an operation indicate in the entry should be repeated, a combination thereof, and/or the like. The one or more fields may be used to indicate bytes in a file of the common storage to skip, a modification of the blocks in the common storage (e.g., application of XOR to mantle blocks), and/or the like.

The second index 406 may be associated with and/or comprise data related to one or more header data of the content (e.g., first portion, container-specific portion, the first portion 202 of FIG. 2). The second index 406 may comprise a plurality of entries (e.g., or records). An entry may comprise one or more fields, such as a number of bytes to copy from the reconstructed content (e.g., the bitstream file reconstructed using the user-specific portion and the common portion), a number of bytes to copy from the header data of the content, a combination thereof, and/or the like.

The user-specific bytes 408 may comprise user-specific portions (e.g., first portions) copied from the content (e.g., bitstream) by the deconstruction process illustrated in FIGS. 3A-D. The user-specific bytes 408 may be encrypted. If the user-specific bytes 408 are encrypted, key information for decrypting the user-specific bytes may be stored in the header 402.

Figure 5:
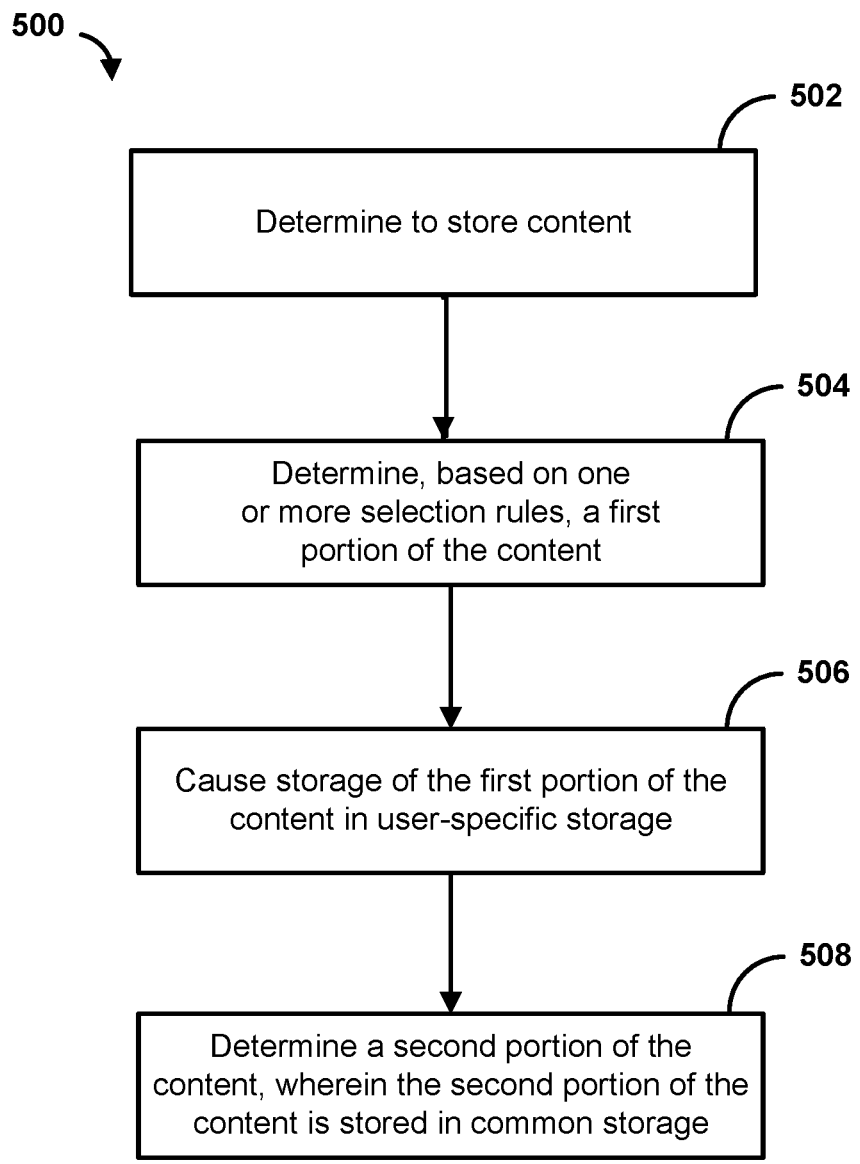
FIG. 5 is a flow diagram showing an example method.

FIG. 5 is a flow diagram showing an example method 500. At step 502, a determination may be made to store content. The content may comprise a content item. The content may be associated with (e.g., received via) a content channel. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The determination to store content associated with a content channel may be determined based on a request associated with a user account of a plurality user accounts. The request may be received from a user device. The request may be a request to access a channel. If a user accesses a channel, a determination to store content may be performed automatically. A user device may specifically request that the content is stored (e.g., or recorded).

A first request to store a content item may be received. A second request to store the content item may be received. The first request may be associated with a first user account of the plurality of user accounts. The second request may be associated with a second user account of the plurality of user accounts. The determination to store content may be made in response to one or more of the first request or the second request.

At step 504, a first portion of the content may be determined. The first portion of the content may be associated with a user (e.g., or an account, user account). The first portion of the content (e.g., or content item) may be associated with the first user account and second user account. The first portion of the content may be determined based on one or more selection rules. The one or more selection rules may comprise one or more of a randomization rule, a randomization function, or a predefined rule for determining portions of the content. The randomization function may comprise a random number generator. The first portion may be determined by using the randomization function to determine how many bytes to select from a beginning of a bit sequence of the content.

A randomized data range may be determined (e.g., using the randomization function). The randomized data range may be determined based on (e.g., in response to receiving, as part of processing) the request. The randomized data range may comprise a number generated using a random number generator (e.g., an algorithm or service that generates a random or pseudo-random number, for example, based on a seed). A first random number (e.g., r[0], which indicates a number in a bit sequence) may be generated to determine a start of the randomized data range. The first random number may be generated such that at least one byte of the content (e.g., a frame) is left from the beginning of the byte range to the end of the content (e.g., end of the frame). A second random number (e.g., r[1]) may be generated to determine a length of the randomized data range. The randomized data range may start at the first random number and end at the second random number added to the first random number (e.g., start at r[0] and end at r[0]+r[1]). The randomized data range may be used to determine the first portion of the content.

At step 506, a first portion of a frame of the content may be caused to be stored. The first portion of the frame may be stored in user-specific storage (e.g., or user-specific storage area) associated with the user account. The user-specific storage may comprise permission controlled storage. Only a subset of user accounts of the plurality of user accounts may have permission to access the user-specific storage. The subset of user accounts may comprise a single user account, a group of user accounts associated with a household, an administrator account, or a combination thereof. The user-specific storage may comprise storage allocated for the user (e.g., as a specific amount of storage, as a specific location of storage, as a specific file of storage, as a specific directory of storage). The user-specific storage may comprise one or more directories, files, data storage entries, and/or the like associated with a corresponding user account.

The first portion of the content may be caused to be stored in a first user-specific storage (e.g., first user-specific storage area) associated with the first user account. The first portion of the content may be caused to be stored in a second user-specific storage (e.g., second user-specific storage area) associated with the second user account. The first portion of the content may be caused to be stored simultaneously (e.g., at least partially at the same time) in both the first user-specific storage area and the second user-specific storage area. Causing storage, of the first portion of the content item in the first user-specific storage area associated with the first user account, and of the first portion of the content item in a second user-specific storage area associated with the second user account may comprise storing two separate copies of the first portion in separate storage locations.

The first portion may comprise data of the frame in the randomized data range. The first portion may be determined by using the number (e.g., or randomized data range) to determine how many bytes (e.g., or bits) to select from a bit sequence of the content. The bit sequence may define the frame (e.g., or a plurality of frames). The bytes (e.g., or bits) may be selected from the beginning (e.g., or other location) of the bit sequence. The first portion may comprise a first set of bytes of a bit sequence defining the frame.

The bit sequence may comprise encoded data, such as an entropy encoded data sequence, a context-adaptive binary arithmetic coding (CABAC) data sequence, a context-based adaptive variable-length coding (CAVLC) data sequence, and/or the like. The bit sequence may comprise encoded content separated from header data.

At step 508, the second portion of the content may be determined. The second portion of the content may be stored in common storage. The second portion of the content may be associated with the plurality of user accounts. Additionally or alternatively, a determination of whether to store a second portion of the content in common storage may be made. The common storage may be associated with a plurality of user accounts. The second portion may comprise a remaining portion of content (e.g., of a section, segment, fame of content) not included in the first portion of the content. The second portion may comprise data of the content not selected based on the one or more selection rules (e.g., data outside of the randomized data range). The second portion may be part of the bit sequence. The second portion may comprise a second set of bytes of the bit sequence. The second portion may be adjacent to the first portion, directly follow (e.g., in bit ordering) the first portion, and/or be associated with the first portion.

Determining whether to store the second portion of the content in the common storage may comprise determining that at least a part of the second portion is already stored in the common storage. If at least a part of the second portion is already stored in the common portion, then the at least a part may not be stored again. Data indicating a location (e.g., in the common storage) of the at least a part of the second portion may be stored (e.g., instead of another copy of the second portion). The data indicating the location may be stored in user-specific storage. If at least a part of the second portion is not already stored in the common portion, then the second portion of the content of the content may be stored in the common storage.

The second portion may be determined for the first user account. The second portion may be determined for the second user account. The second portion may be determined for the first user account and the second user account simultaneously. The determination of the second portion for both the first user account and the second user account may be a single determination and/or may be separate determinations. The second portion may be determined for all of the plurality of user accounts simultaneously (e., as one single determination). The second portion may be determined for this first user account before or after the second portion is determined for the second user account. If the second portion is determined for the second user account after the second portion is determined for the first user account, the second portion may not be stored a second time for the second user account (e.g., if the second portion was already stored for the first user account). The second portion stored for the first user account may be referenced by data for determining the content stored in the second user-specific storage associated with the second user account.

A section (e.g., segment) of content may be stored in memory (e.g., random access memory). The section of content may be stored as part of recording a content item comprising a plurality of sections of content. A first portion and a second portion may be determined. The second portion may be stored in common storage. A plurality of copies of the first portion may be copied to corresponding user-specific storage associated with different user accounts. If the first portions are different for different users (e.g., based on watermarking information), the different first portions may be copied to the corresponding user-specific storage. The process may be performed on a per user account basis. The first portion may be stored for a first user account. The first portion may remain in the memory and be used to make copies of the first portion for additional user accounts. This process may be repeated for each section of the content.

The common storage may comprise data storage (e.g., a file, directory, storage location, storage volume, data structure, and/or the like) shared by the plurality of user accounts. The common storage may be associated with the content. The common storage may be specific to the content and/or content channel. Each content channel may have a different common storage location (e.g., directory) associated with (e.g., dedicated to, allocated to) the content channel.

The common storage may comprise an unplayable (e.g., unrecognizable as a media file, undecodable by a media player) combination of data. The common storage may be organized such that the original content is not reproducible (e.g., visually or aurally) from the common storage alone (e.g., by any particular user account of the plurality of user accounts). Randomized data and the second portion may be combined. The randomized data may be generated based on the random number generator. The randomized data may have a randomly determined size, number of bits, sequence of bits, and/or the like. Storing the second portion may comprise storing the combination of the second portion and the randomized data.

Data for determining (e.g., reconstituting) the content (e.g., one or more frames) may be stored. The data for determining the content may be stored in the user-specific storage. The user-specific storage may comprise header data, portions of media data, index information, and/or the like associated with a corresponding user account. The data for determining the content may indicate a location of the first portion in the user-specific storage. The data for determining the content may indicate a location of the second portion in the common storage. The data for determining the content may store at least one uniform resource identifier, such as a uniform resource identifier for locating the first portion, a uniform resource identifier for locating the second portion, a protocol identifier (e.g., http, https, scp, ftp, etc.) and/or the like. The data for determining the content may comprise at least one identifier corresponding to a database record indicating one or more of a location of the first portion or a location of the second portion. The data for determining the content may comprise at least one file system path indicating a location of one or more of the first portion or the second portion.

The data for determining the content may be stored in an index file (e.g., or other manifest or data structure). The index file may comprise a record for each portion of the content (e.g., or each portion of a section comprise a plurality of portions). The data for determining the content may be stored as a record in the index file. The data for determining the content may comprise an indication of the first portion, a location of the first portion (e.g., a file, a directory, a byte offset in a bit sequence stored in the user-specific storage, a range of bits), and/or the like. The data for determining the content may comprise an indication of the second portion, a location of the second portion (e.g., a file, a directory, a byte offset in a bit sequence stored in the common storage, a range of bits), and/or the like.

Steps 502 through 508 may be performed for one or more (or each) of a plurality of portions of the content. The content may comprise a plurality of segments, sections, frames, and/or the like (e.g., stored in packets). A first sections of a plurality of sections of the content may be determined. The first section may comprise header data and macroblock data. The header data may comprise data for processing the macroblock data and the macroblock data may comprise video frame data. The header data may be stored in one or more files separate from the second portion and/or the first portion. The first portion and the second portion may be portions of the macroblock data. The header data may be stored in the common storage. An additional index file may be generated based on the header data. The additional index file may comprise information for reconstituting the header data and associated macroblock data. The additional index file may be stored in the user-specific storage and/or the common storage. The additional index file may comprise an indication of the header data, a location of the header data (e.g., a file, a directory, a byte offset in a bit sequence, a range of bits). The additional index file may comprise an indication of the macroblock data, a location of the macroblock data (e.g., a file, a directory, a byte offset in a bit sequence, a range of bits), a reference to the macroblock data in another index file (e.g., the index file for reconstituting the first portion and the second portion.

Data associated with the content may be output. The data associated with the content may comprise an indication of the stored content may be output. The indication of the stored content may comprise an alert, an electronic mail message, an indicator in a graphical user interface (e.g., an indication of a recording), a notification associated with an application (e.g., a mobile device app notification). Outputting the data associated with the content may comprise outputting the indication above a rendering of the content (e.g., a notice of recording a content while it is shown on a display). The data associated with the content may comprise a reconstitution of the content (e.g., based on the first portion and the second portion).

Figure 6:
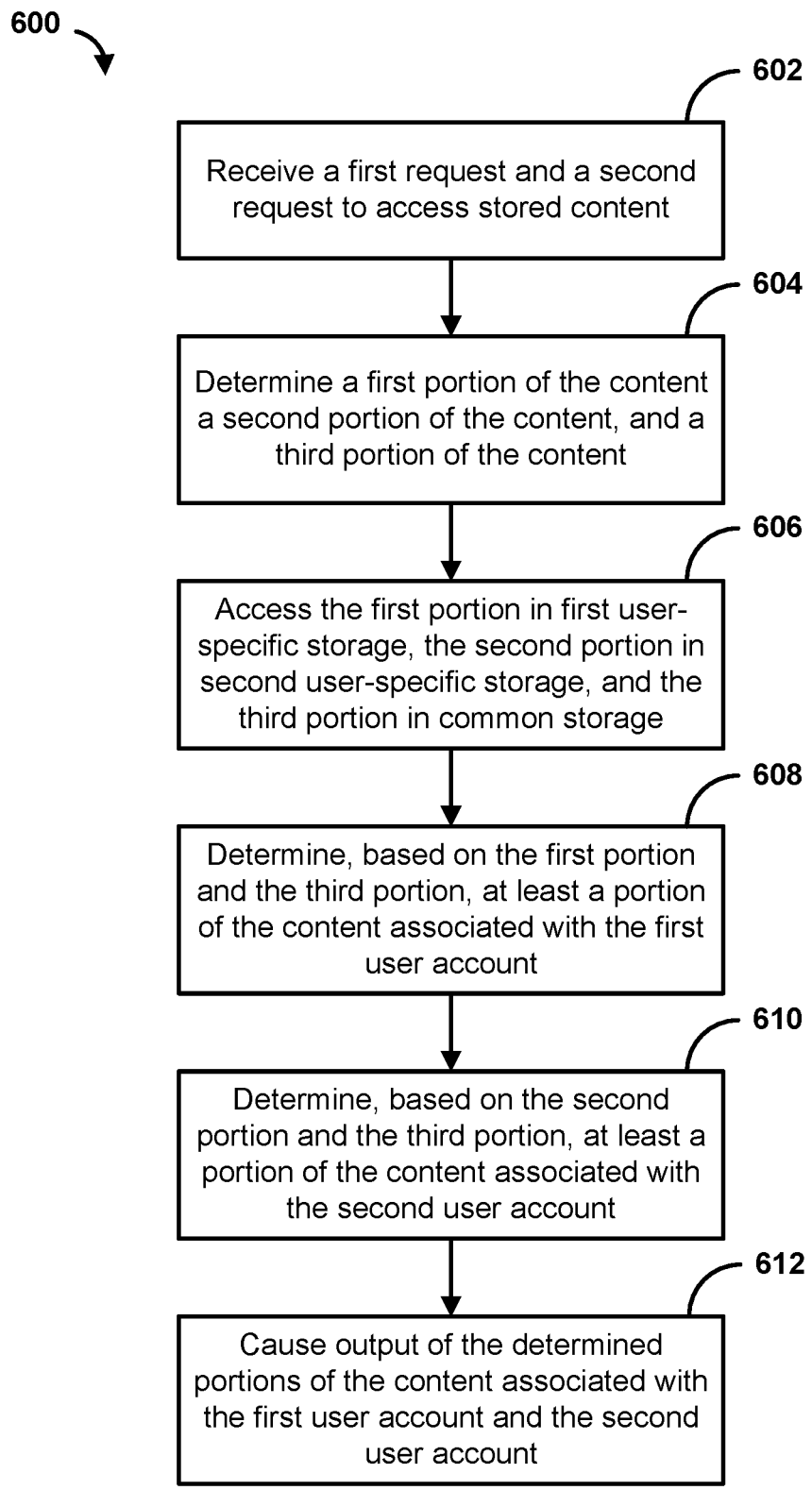
FIG. 6 is a flow diagram showing an example method.

FIG. 6 is a flow diagram showing an example method 600. At step 602, a request to access stored content may be received. A first request to access stored content associated with a first user account may be received. A second request to access stored content associated with a second user account may be received. The first request and the second request may both be associated with the same stored content and/or content item (e.g., but may relate to different copies of the same stored content). The stored content may comprise text, audio, video, an application (e.g., a game), a combination thereof and/or the like. The stored content may comprise a recording (e.g., or otherwise stored) of a content channel. The content channel may comprise a content stream, such as linear stream of content (e.g., live content). The content may comprise a show, movie, program, episode, broadcast, newscast, sportscasts, live stream, combination thereof, and/or the like. The request may be received from a user device. The request may be received by a content device, such as digital streaming device, a set top box, a content server, and/or the like.

At step 604, a first portion of the content may be determined. A second portion of the content may be determined. A third portion of the content may be determined. The first portion, second portion, and/or third portion may be determined using one or more selection rules. The first portion may comprise data of the content stored in first user-specific storage. The first user-specific storage may be associated with a first user account associated with the first request. The second portion may comprise data of the content stored in second user-specific storage. The second user-specific storage may be associated with a second user account associated with the second request. The third portion may comprise a remaining portion of the content not included in the first portion and/or second portion. The remaining portion may comprise a remaining portion of a section, frame, segment, and/or the like of the content.

The one or more selection rules may comprise one or more of a randomization rule, a randomization function, or a predefined rule for determining portions of the content. The randomization function may comprise a random number generator. The first portion and/or second portion may be determined by using the randomization function to determine how many bytes to select from a beginning of a bit sequence of the content.

The first portion and/or second portion may comprise data of the content in a randomized data range. The randomized data range may comprise a number of bits that is determined using the randomization function. The first portion and/or second portion may be stored in the user-specific storage by using a number (e.g., or randomized data range) to determine how many bytes (e.g., or bits) to select from a bit sequence of the content. The bit sequence may define the content (e.g., or frame, section, segment, or block of content). The bytes (e.g., or bits) may be selected from the beginning (e.g., or other location) of the bit sequence. The first portion and/or second portion may comprise a first set of bytes of a bit sequence defining the content. The bit sequence may comprise encoded data, such as an entropy encoded data sequence, a context-adaptive binary arithmetic coding (CABAC) data sequence, a context-based adaptive variable-length coding (CAVLC) data sequence, and/or the like. The bit sequence may comprise encoded content separated from header data.

The third portion may comprise data of the content outside of the randomized data range (e.g., within a section, segment, frame, block). The third portion may be part of the bit sequence. The third portion may comprise a second set of bytes of the bit sequence. The third portion may be adjacent to the first portion and/or second portion, directly follow (e.g., in bit ordering) the first portion and/or the second portion, be associated with the first portion and/or second portion, or a combination thereof.

Determining the first portion, second portion, and/or the third portion may comprise accessing data for determining the content. The data for determining the content may be accessed and/or stored in the first user-specific storage. The data for determining the content may be accessed and/or stored in the second user-specific storage. The data for determining the content may indicate a location of the first portion in the first user-specific storage. The data for determining the content may indicate a location of the second portion in the second user-specific storage. The data for determining the content may indicate a location of the third portion in common storage.

The data for determining the content may be stored in an index file (e.g., or other manifest or data structure). The index file may comprise a record for each of a plurality of portions of the content. Each frame, segment, section, block, and/or like of the content may have one or more records comprising corresponding first portions (e.g., or second portions) and third portions of the content. The data for determining the content may comprise an indication of the first portion, a location of the first portion (e.g., a file, a directory, a byte offset in a bit sequence stored in the first user-specific storage, a range of bits), and/or the like. The data for determining the content may comprise an indication of the second portion, a location of the second portion (e.g., a file, a directory, a byte offset in a bit sequence stored in the second user-specific storage, a range of bits), and/or the like. The data for determining the content may comprise an indication of the third portion, a location of the third portion (e.g., a file, a directory, a byte offset in a bit sequence stored in the common storage, a range of bits), and/or the like. The data for determining the content may comprise an ordering of the first portion and the third portion (e.g., in a bit sequence). The data for determining the content may comprise an ordering of the second portion and the third portion (e.g., in a bit sequence).

The first user-specific storage and/or second user-specific storage may comprise permission controlled storage. Only a subset of user accounts of the plurality of user accounts may have permission to access the first user-specific storage and/or second user-specific storage. The first user-specific storage may comprise storage allocated for a first user (e.g., as a specific amount of storage, as a specific location of storage, as a specific file of storage, as a specific directory of storage). The user-specific storage may comprise one or more directories, files, data storage entries, and/or the like associated with a corresponding first user account. The second user-specific storage may comprise storage allocated for a second user (e.g., as a specific amount of storage, as a specific location of storage, as a specific file of storage, as a specific directory of storage). The second user-specific storage may comprise one or more directories, files, data storage entries, and/or the like associated with a corresponding second user account.

The common storage may comprise data storage (e.g., a file, directory, storage location, storage volume, data structure, and/or the like) shared by the plurality of user accounts (e.g., the first user account, and the second user account). The common storage may be associated with the content. The common storage may be specific to the content and/or content channel. Each content channel may have a different common storage location (e.g., directory) associated with (e.g., dedicated to, allocated to) the content channel.

The common storage may comprise an unplayable (e.g., unrecognizable as a media file or as bit stream of a media file, undecodable by a media player) combination of data. The common storage may be organized such that the original content is not reproducible (e.g., visually or aurally) from the common storage alone (e.g., by any particular user account of the plurality of user accounts). Randomized data and the third portion may be combined. Randomized data may be added to the third portion (e.g., as part of a storage process). The combination of the randomized data and the third portion may be stored together in the common storage. The randomized data may be generated based on the random number generator. The randomized data may have a randomly determined size, number of bits, sequence of bits, and/or the like.

At step 606, the first portion may be accessed in the first user-specific storage. The first portion may be accessed based on first data for determining the content. The first portion may be accessed based on a record for determining the content. The second portion may be accessed in the second user-specific storage. The second portion may be accessed based on second data for determining the content. The second portion may be accessed based on a record for determining the content. The third portion may be accessed in common storage associated with a plurality of user accounts. Accessing the third portion may comprise accessing the third portion in a file shared by the plurality of user accounts and associated with the content. The third portion may be accessed based on data for determining the content. Accessing the third portion may comprise accessing the combination of the third portion and the randomized data. Accessing the third portion may comprise accessing the third portion without the randomized data.

At step 608, at least a portion of the content associated with the first user account may be determined (e.g., reconstituted). The at least the portion of the content associated with the first user account may be determined based on (e.g., using) the first portion from the first user-specific storage and the third portion from the common storage. The first portion may be combined with the third portion (e.g., based on the first data for determining the content).

At step 610, at least a portion of the content associated with the second user account may be determined (e.g., reconstituted). The at least the portion of the content associated with the second user account may be determined based on (e.g., using) the second portion from the second user-specific storage and the third portion from the common storage. The second portion may be combined with the third portion (e.g., based on the second data for determining the content)

Steps 602 through 610 may be performed for one or more (or each) of a plurality of portions of the content. The content may comprise a plurality of segments, sections, frames, and/or the like (e.g., stored in packets). Determining the at least a portion of the content (e.g., associated with the first user account and/or associated with the second user account) may comprise determining a data section (e.g., or segment) by combining header data and macroblock data. The header data may comprise data for processing the macroblock data. The macroblock data may comprise video frame data (e.g., or other content data). The header data may be accessed in a file separate from the second portion, third portion, and/or the first portion. The first portion, second portion, and/or the third portion may be determined (e.g., combined, reconstituted) to form portions of the macroblock data. The header data may be accessed in the common storage.

An additional index file may be accessed. The additional index file may comprise information for determining the header data and associated macroblock data. The additional index file may be accessed and/or stored in the first user-specific storage, the second user-specific storage, and/or the common storage. The additional index file may comprise an indication of the header data, a location of the header data (e.g., a file, a directory, a byte offset in a bit sequence, a range of bits). The additional index file may comprise an indication of the macroblock data, a location of the macroblock data (e.g., a file, a directory, a byte offset in a bit sequence, a range of bits), a reference to the macroblock data in another index file (e.g., the index file for reconstituting the first portion, the second portion, and/or the second portion.

At step 612, the determined at least a portion of the content associated with the first user account may be caused to be output. The determined at least a portion of the content associated with the second user account may be caused to be output. Causing output of the at least the portion of the content (e.g., associated with the first user account and/or the second user account) may comprise sending, transmitting, rendering, displaying, and/or the like of the determined at least a portion of the content. The determined at least a portion of the content (e.g., associated with the first user account and/or the second user account) may be output by a content device that requested access to the stored content. The determined at least a portion of the content (e.g., associated with the first user account and/or the second user account) may be output as part of a plurality of portions of the content (e.g., frames, sections, segments, blocks).

Figure 7:
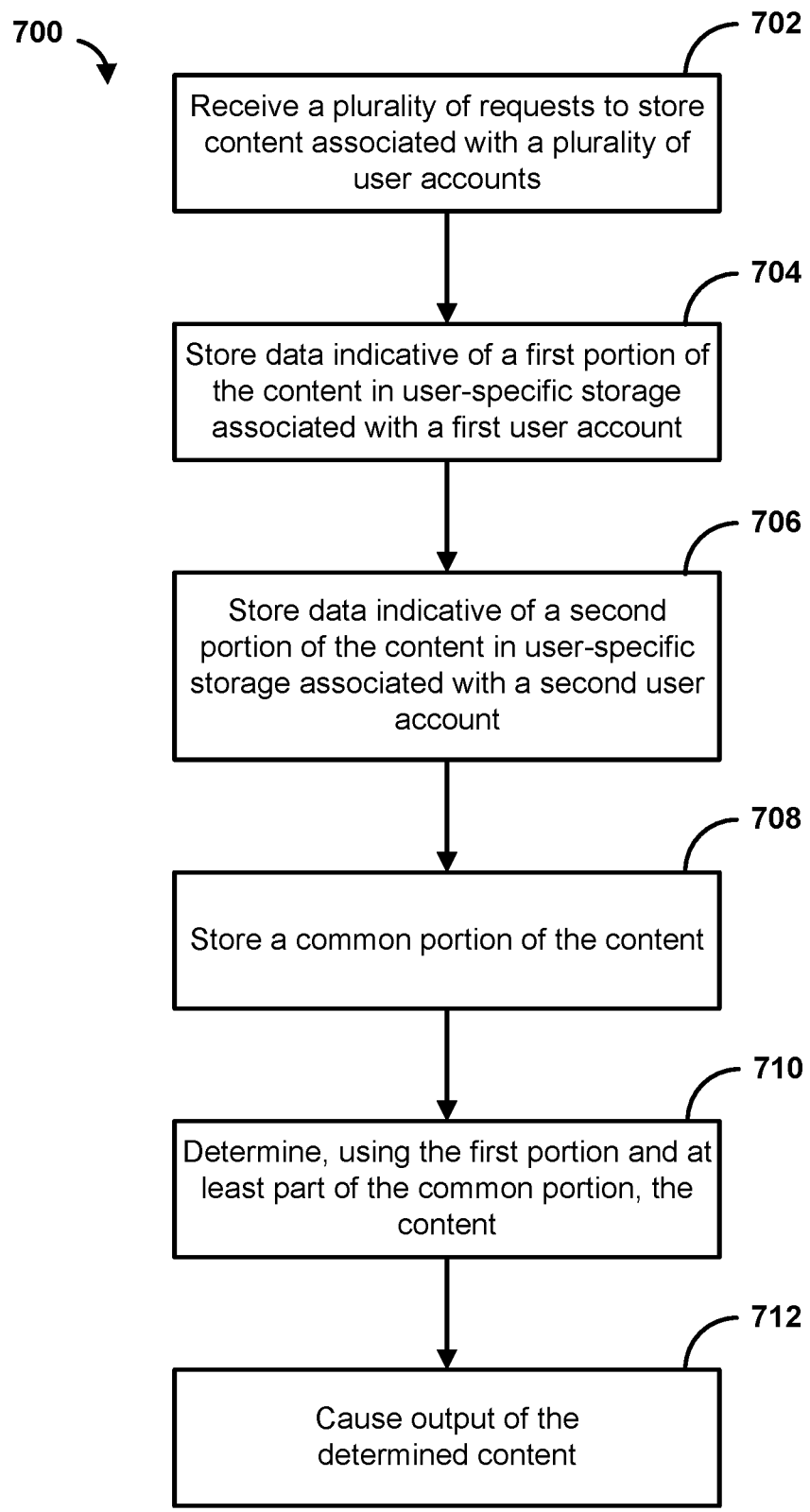
FIG. 7 is a flow diagram showing an example method.

FIG. 7 is a flow diagram showing an example method 700. At step 702, a plurality of requests to store content associated with a plurality of user accounts may be received. Each request may be associated with a corresponding user account of the plurality of user accounts. The plurality of requests may be received at different times, from different user devices, and/or the like. The plurality of requests may be requests to access (e.g., view) a stored and/or recorded content item.

At step 704, data indicative of a first portion of the content (e.g., or frame of the content, section of content, segment of content) may be stored in user-specific storage associated with a first user account of a plurality of user accounts. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The data indicative of the first portion of the content may be stored based on a request associated with the first user account of the plurality user accounts. The request may be received from a first user device. The request may be a request to access a channel. If a first user account accesses a channel, a determination to store content may be made (e.g., based on system or user setting). The first user account may specifically request that the content is stored (e.g., or recorded).

The data indicative of the first portion of the content may be stored (e.g., and determined) based on one or more selection rules. The one or more selection rules may comprise one or more of a randomization rule, a randomization function (e.g., or a predefined rule for determining portions of the content). The randomization function may be configured to determine a random number. The data indicative of the first portion may be determined by using the number to determine how many bytes to select from a beginning of a bit sequence defining the content.

The first portion may comprise data in a first randomized data range of the content. The first randomized data range may comprise a first number generated using the randomization function. The randomization function may comprise a random number generator (e.g., an algorithm or service that produces a random or pseudo-random number, for example, based on a seed). The first portion may be determined by using the first number to determine how many bytes (e.g., or bits) to select from a beginning of a bit sequence. The bit sequence may define the content (e.g., or frame, section, segment, or block of the content). The bytes (e.g., or bits) may be selected from the beginning (e.g., or other location) of the bit sequence. The first portion may comprise a first set of bytes of the bit sequence. The bit sequence may comprise encoded data, such as an entropy encoded data sequence, a context-adaptive binary arithmetic coding (CABAC) data sequence, a context-based adaptive variable-length coding (CAVLC) data sequence, and/or the like. The bit sequence may comprise encoded content separated from header data.

The data indicative of the first portion of the content may comprise one or more of data comprising the first portion or data comprising an index (e.g., or manifest) identifying a location of the first portion in one or more of the first user-specific storage or the common storage. The data comprising an index may comprise the first index file described in more detail below. In some scenarios, one or more copies of a user-specific portion may be stored one or more times in the common storage. The data indicative of the first portion may comprise data indicating a first location of one of the one or more copies of the user-specific portions stored in the common storage.

The first user-specific storage may comprise permission controlled storage. Only a subset of user accounts of the plurality of user accounts may have permission to access the user-specific storage. The first user-specific storage may comprise storage allocated for the first user account (e.g., as a specific amount of storage, as a specific location of storage, as a specific file of storage, as a specific directory of storage). The first user-specific storage may comprise one or more directories, files, data storage entries, and/or the like associated with the first account.

At step 706, data indicative of a second portion of the content (e.g., or frame of the content, section of content, segment of content) may be stored in user-specific storage associated with a second user account of the plurality of user accounts. The first portion of the content may be stored based on a request associated with the second user account. The request may be received from a second user device. The request may be a request to access the channel. If a second user account accesses a channel, a determination to store content may be made (e.g., based on system or user setting). The second user account may specifically request that the content is stored (e.g., or recorded).

The second portion may comprise data in the first randomized data range of the content. The randomization function may be deterministically applied such that both the first portion and the second portion comprise the same portion of the content. The randomized data range (e.g., or random number) may vary from one section, frame, segment, and/or the like of content to another. For a first section of content, the first portion and second portion may each comprise X number of bits from the first section (e.g., the first X number of bits of the first section). For a second section of content, the first portion and second portion may comprise Y number of bits from the second section (e.g., the first Y number of bits from the second section). X and Y may be different random numbers determined by the randomization function. The second section may be section of the content that follows the first section of the content.

The data indicative of the second portion of the content may be stored. The data indicative of the second portion may comprise one or more of data comprising the second portion or data comprising an index (e.g., or manifest) identifying a location of the second portion in one or more of the second user-specific storage or the common storage. The data comprising an index may comprise the second index file described in more detail below. One or more copies of a user-specific portion may be stored one or more times in the common storage. The data indicative of the second portion may comprise data indicating a second location of one of the one or more copies of the user-specific portions stored in the common storage. The second location may be different than the first location. The second location and the first location may each comprise identical copies of the same user-specific portion.

The second user-specific storage may comprise permission controlled storage. Only a subset of user accounts of the plurality of user accounts may have permission to access the second user-specific storage. The second user-specific storage may comprise storage allocated for the second user account (e.g., as a specific amount of storage, as a specific location of storage, as a specific file of storage, as a specific directory of storage). The second user-specific storage may comprise one or more directories, files, data storage entries, and/or the like associated with the second account.

At step 708, a common portion of the content may be stored. The common portion may be stored in common storage associated with the first user account and the second user account. The common portion may be part of the bit sequence. The common portion may be adjacent to the first portion, directly follow (e.g., in bit ordering) the first portion, and/or otherwise be associated with the first portion. The common portion may be adjacent to the second portion, directly follow (e.g., in bit ordering) the second portion, and/or otherwise be associated with the second portion.

Storing the common portion may comprise determining, based on a request associated with the first user account, to store the common portion. Storing the common portion may comprise determining, based on a request associated with the second user account, that the common portion is already stored. After (e.g., or in response to) receiving the request associated with the second user account, a determination can be made as to whether the common portion determined for the second user account is already stored. If the common portion is already stored, then data indicating a location of the common portion in the common storage can be stored (e.g., in user-specific storage associated with the second account).

Storing the common portion may comprise storing the common portion in a file (e.g., or directory or other resource) accessible by the first user account and the second user account. The common storage may comprise data storage (e.g., a file, directory, storage location, storage volume, data structure, and/or the like) shared by the plurality of user accounts. The common storage may be associated with the content. The common storage may be specific to the content and/or content channel. Each content channel may have a different common storage location (e.g., directory) associated with (e.g., dedicated to, allocated to) the content channel.

The common storage may comprise an unplayable (e.g., unrecognizable as a media file, undecodable by a media player) combination of data. The common storage may be organized such that the original content is not reproducible (e.g., visually or aurally) from the common storage alone (e.g., by any particular user account of the plurality of user accounts). Randomized data and the common portion may be combined. The randomized data may be generated based on the random number generator. The randomized data may have a randomly determined size, number of bits, sequence of bits, and/or the like. Storing the common portion may comprise storing the combination of the common portion and the randomized data.

At step 710, the content (e.g., a portion of content, a frame of content, a section of content, a segment of content) may be determined (e.g., reconstituted). The content may be determined based on (e.g., in response to) a request. The request may be associated with the first user account. The content may be determined based on (e.g., using) the first portion (e.g., if requested by the first user account) and/or the second portion (e.g., if requested by the second user account). The content may be determined based on at least a portion of the common portion.

First data for determining (e.g., reconstituting) the content for the first user account may be stored. The first data for determining the content may be stored in the first user-specific storage. The first data for determining the content may indicate a location of the first portion in the first user-specific storage. The first data for determining the content may indicate a location of at least a first part of the common portion in the common storage. The first data for determining the content may be stored in a first index file (e.g., or other manifest or data structure). The first index file may comprise a record for a plurality of portions of the content (e.g., or frames, segments, sections, or blocks of content). The first data for determining the content may be stored as a record in the first index file. The first data for determining the content may comprise an indication of the first portion, a location of the first portion (e.g., a file, a directory, a byte offset in a bit sequence stored in the first user-specific storage, a range of bits), and/or the like. The first data for determining the content may comprise an indication of at least the first part of the common portion, a location of at least the first part of the common portion (e.g., a file, a directory, a byte offset in a bit sequence stored in the common storage, a range of bits), and/or the like.

Second data for determining (e.g., reconstituting) the content for the second user account may be stored. The second data for determining the content may be stored in the second user-specific storage. The second data for determining the content may indicate a location of the second portion in the second user-specific storage. The second data for determining the content may indicate a location of at least a second part (e.g., equal to or different from the first part) of the common portion in the common storage. The second data for determining the content may be stored in a second index file (e.g., or other manifest or data structure). The second index file may comprise a record for each of a plurality of portions of the content (e.g., or frames, segments, sections, or blocks of content). The second data for determining the content may be stored as a record in the second index file. The second data for determining the content may comprise an indication of the second portion, a location of the second portion (e.g., a file, a directory, a byte offset in a bit sequence stored in the second user-specific storage, a range of bits), and/or the like. The second data for determining the content may comprise an indication of at least the second part of the common portion, a location of at least the second part the common portion (e.g., a file, a directory, a byte offset in a bit sequence stored in the common storage, a range of bits), and/or the like.

Steps 702 through 710 may be performed for one or more (or each) of a plurality of portions (e.g., frames, section, segments, blocks) of the content. The plurality of portions stored for the first user account may be the same, different (e.g., completely different or only partially overlapping) as a plurality of portions stored for the second account. The content may comprise a plurality of sections (e.g., or segments, stored in packets).

A first section of a plurality of sections of the content may be determined. The first section may comprise header data and macroblock data. The header data may comprise data for processing the macroblock data. The macroblock data comprises video frame data (e.g., or other content frame data). The first portion and the second portion may be portions of the macroblock data. The header data may be stored in one or more files separate from the first portion, the second portion, or the common portion. The first portion, the second portion, and the common portion may be portions of the macroblock data. The header data may be stored in the common storage. One or more additional index files may be generated based on the header data. The one or more additional index files may comprise information for determining (e.g., reconstituting) the header data and associated macroblock data. The one or more additional index files may be stored in the first user-specific storage, the second user-specific storage, and/or the common storage. The one or more additional index files may comprise an indication of the header data, a location of the header data (e.g., a file, a directory, a byte offset in a bit sequence, a range of bits). The one or more additional index files may comprise an indication of the macroblock data, a location of the macroblock data (e.g., a file, a directory, a byte offset in a bit sequence, a range of bits), a reference to the macroblock data in another index file (e.g., the first index file, the second index file).

At step 712, the determined content (e.g., reconstituted frame, section, segment) may be caused to be output. The determined content may be caused to be output based on a request associated with the first user account. Causing the determined content to be output may comprise causing sending, transmitting, rendering, displaying, and/or the like of the determined content. The determined content may be output by a content device that requested access to the stored content.

Figure 8:
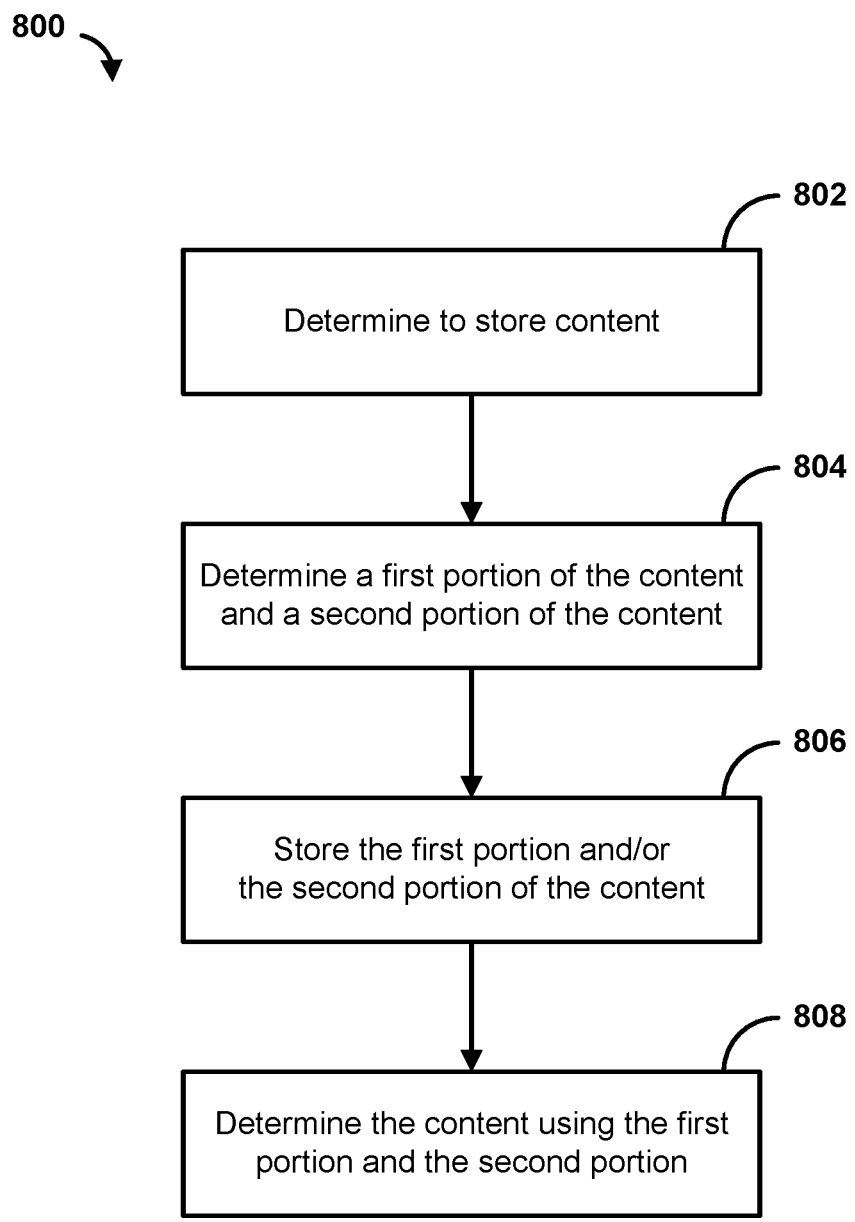
FIG. 8 is a flow diagram showing an example method.

FIG. 8 is a flow diagram showing an example method 800. The example method 800 can comprise an example implementation of the process shown in FIG. 3A.

At step 802, a determination may be made to store content. The content may be associated with (e.g., received via) a content channel. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The determination to store content may be determined based on a request associated with a user account of a plurality user accounts. The request may be received from a user device. The request may be a request to access a channel. If a user accesses a channel, a determination to store content may be performed automatically. A user device may specifically request that the content is stored (e.g., or recorded).

At step 804, a first portion of the content and a second portion of the content may be determined. The first portion and/or the second portion may be determined using a randomization function, (e.g., or other selection rule such as a predefined rule). The first portion and/or the second portion may be portions of a segment, a section, a frame, a block, a bit sequence, and/or the like. The second portion may comprise a remaining portion of the content (e.g., or section of content) not included in the first portion.

At step 806, the first portion and/or the second portion may be stored. The first portion may be stored in user-specific storage. The second portion of the content may be stored in common storage.

One or more of steps 802, 804, or 806 may be repeated (e.g., until all the content is stored). The content may comprise a plurality of sections (e.g., segments, frames, blocks, bits sequences). Each of the sections may be subdivided into one or more first portions and one or more second portions. The randomization function (e.g., or other selection rule) may be applied such that the location and/or size of the one or more first portions may be different from one section to another. The randomization function (e.g., or other selection rule) may be applied such that the location and/or size of the one or more second portions may be different from one section to another. One or more of the first portions may be stored as a single file, bit sequence, and/or the like in the user-specific storage. One or more of the second portions may be stored as a single file, bit sequence, and/or the like in the common storage.

At step 808, the content may be determined (e.g., reconstituted) based on (e.g., using) the first portion and the second portion. The first portion and the second portion may be combined (e.g., as a single bit sequence, a segment, a section, a frame, a block) to determine the content.

One or more of steps 802, 804, 806, or 808 may be repeated for a plurality of user accounts (e.g., or user devices). The second portions may be the same for at least a portion of the plurality of users (e.g., or each of the plurality of users). Only one copy of the second portion may be stored in the common storage. The first portions may be the same (e.g., identical, bitwise identical) for at least a portion of the plurality of users (e.g., or each of the plurality of user). The randomization function (e.g., other selection rule) may be applied (e.g., deterministically) such that the same first portions and same the same second portions are determined for each of the at least the portion of the users.

Figure 9:
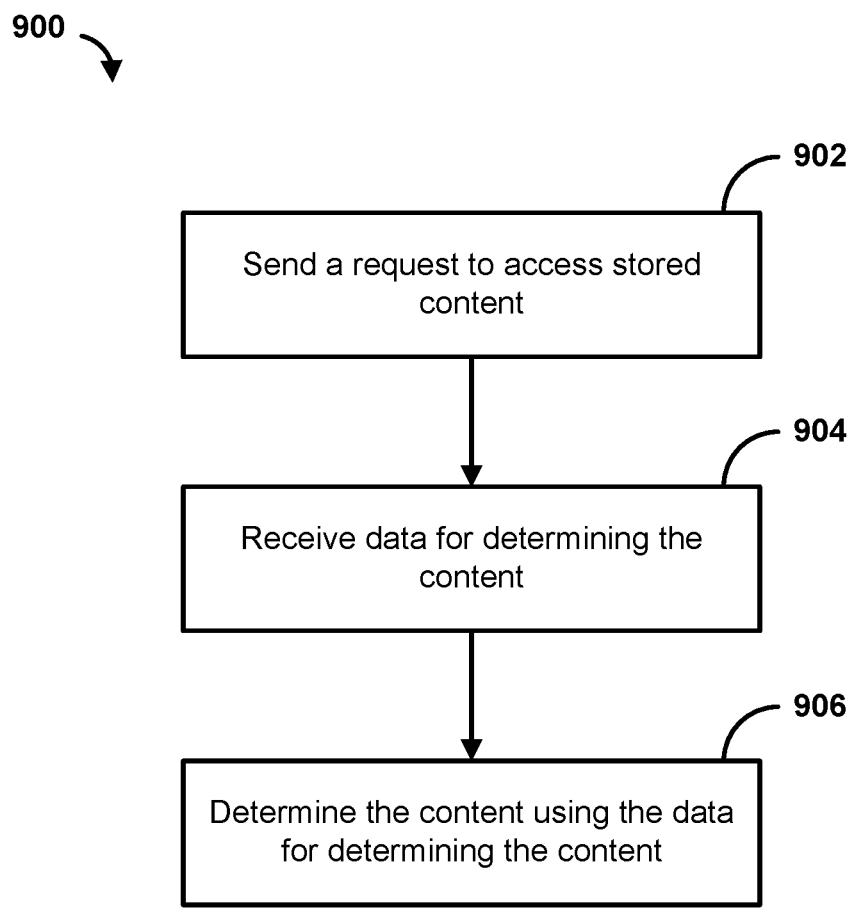
FIG. 9 is a flow diagram showing an example method.

FIG. 9 is a flow diagram showing an example method. The example method 900 may comprise an example implementation of the process shown in FIG. 3A. The method 900 may be implemented by one or more user devices, such as a mobile device, a streaming device, a content device, a television, a tablet, a laptop, a smart device (e.g., smart glasses, smart watch), and/or the like.

A request to store content may be sent. The request may be sent to a computing device, a service, a server, and/or the like. The request to store content may be a request to access a channel. If a user accesses a channel, a determination to store content may be performed automatically. A user device may specifically request that the content is stored (e.g., or recorded).

Content may be stored (e.g., by the computing device). The content may be stored according to the process described in FIG. 3A (e.g., and FIG. 8) and its accompanying paragraphs. The content may be stored according to any process described elsewhere herein. The content may be stored based on a request. The request may be sent to a computing device, a service, a server, and/or the like. The request to store content may be a request to access a channel. If a user accesses a channel, a determination to store content may be performed automatically. A user device may specifically request that the content is stored (e.g., or recorded).

The content may be stored based on storing portions of the content in user-specific storage and/or common storage. A first portion of the content may be determined using one or more selection rules, such as a randomization function. A second portion of the content may be determined. The second portion may comprise a remaining portion of the content (e.g., or a remaining portion of a section of content) not included in the first portion of the content. The first portion and the second portion may comprise portions of a section (e.g., segment, frame, bit sequence, block) of content. The first portion may be stored in user-specific storage associated with the user account. The second portion may be stored in common storage associated with a plurality of user accounts.

At step 902, a request to access the stored content may be sent. The request may be associated with a user account of a plurality of user accounts. The request may be sent based on receiving a user selection of the stored content. An indication of the stored content may be output (e.g., via a display) to a user. The user may select the indication of the stored content and/or otherwise trigger the request to access the stored content.

At step 904, data for determining the content may be received. The data for determining the content may comprise an index file (e.g., or manifest, or other data structure). The index file may comprise a record (e.g., entry) for each of a plurality of portions of the content. Each frame, segment, section, block, and/or like of the content may have one or more records comprising corresponding first portions and second portions of the content. The data for determining the content may comprise an indication of the first portion, a location of the first portion (e.g., a file, a directory, a byte offset in a bit sequence stored in the user-specific storage, a range of bits), and/or the like. The data for determining the content may comprise an indication of the second portion, a location of the second portion (e.g., a file, a directory, a byte offset in a bit sequence stored in the common storage, a range of bits), and/or the like. The data for determining the content may comprise an ordering of the first portion and the second portion (e.g., in a bit sequence).

At step 906, the stored content may be determined using the data for determining the content. The stored content may be determined by accessing (e.g., requesting) the first portion and the second portion using one or more of locations and/or ordering in the data for determining the content. The determined content may be output via the user device.

Figure 10:
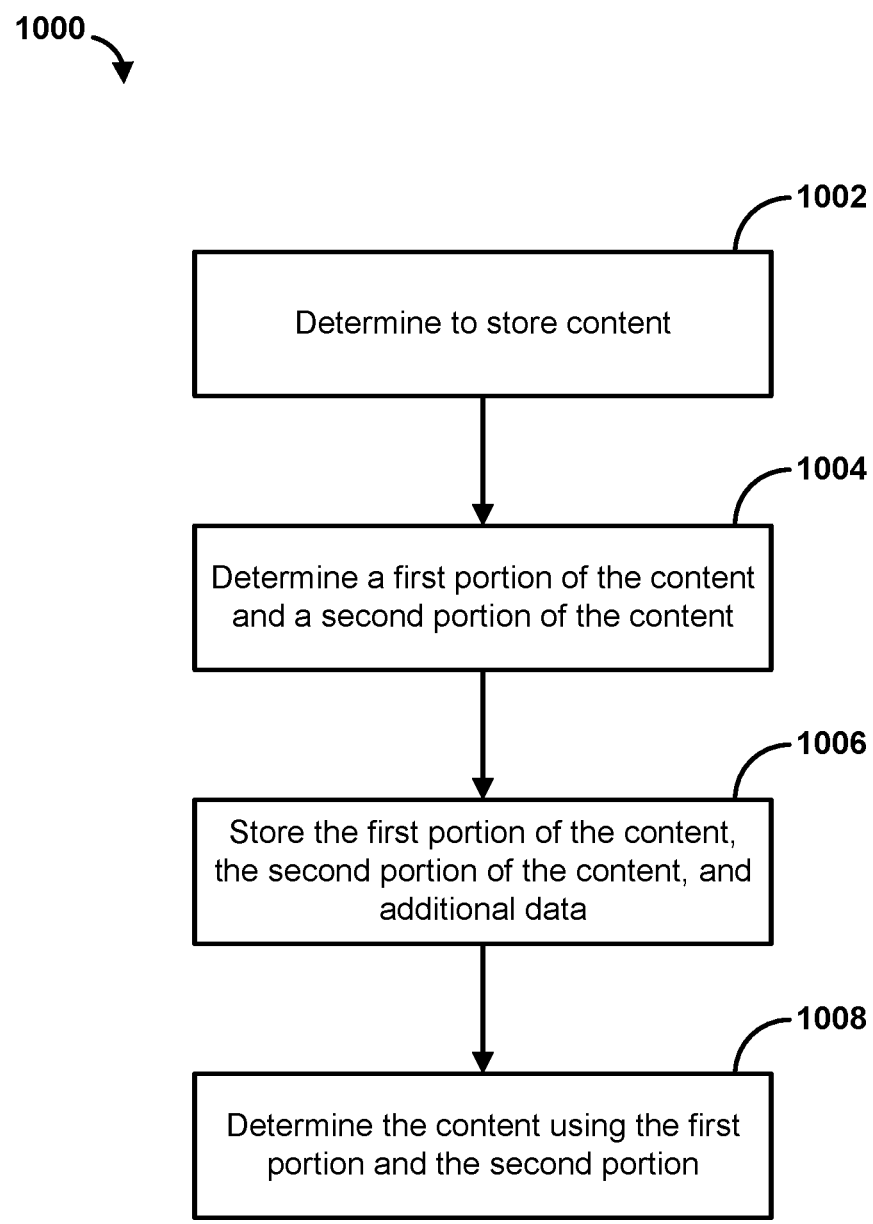
FIG. 10 is a flow diagram showing an example method.

FIG. 10 is a flow diagram showing an example method. The example method 1000 may comprise an example implementation of the process shown in FIG. 3B.

At step 1002, a determination may be made to store content. The content may be associated with (e.g., received via) a content channel. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The determination to store content may be determined based on a request associated with a user account of a plurality user accounts. The request may be received from a user device. The request may be a request to access a channel. If a user accesses a channel, a determination to store content may be performed automatically. A user device may specifically request that the content is stored (e.g., or recorded).

At step 1004, a first portion of the content and a second portion of the content may be determined. The first portion and/or the second portion may be determined using one or more selection rules (e.g., the one or more selection rules described herein), such as a randomization function. The first portion and/or the second portion may be portions of a segment, a section, a frame, a block, a bit sequence, and/or the like. The second portion may comprise a remaining portion of the content (e.g., or section of content) not included in the first portion.

At step 1006, the first portion and/or the second portion may be stored. The first portion may be stored in user-specific storage. The second portion of the content may be stored in common storage. Additional data may be stored in the common storage with the second portion. The additional data may be prepended to, appended to, inserted within, and/or the like the second portion. The additional data may comprise random data. The random data may have a random length. The random length may be constrained by a minimum length and/or a maximum length). The random data may have randomly selected (e.g., or generated) data bits. In addition or in the alternative, the additional data may be stored in user-specific storage (e.g., prepended to, appended to, inserted within, and/or the like one or more first portions).

One or more of steps 1002, 1004, or 1006 may be repeated (e.g., until all the content is stored). The content may comprise a plurality of sections (e.g., segments, frames, blocks, bits sequences). Each of the sections may be subdivided into one or more first portions and one or more second portions. One or more of the first portions may be stored as a single file, bit sequence, and/or the like in the user-specific storage. One or more of the second portions may be stored as a single file, bit sequence, and/or the like in the common storage. The additional data may be stored between two second portions stored in the common storage. The one or more selection rules may be applied such that the location and/or size of the one or more first portions may be different from one section to another. The one or more selection rules may be applied such that the location and/or size of the one or more second portions may be different from one section to another.

At step 1008, the content may be determined (e.g., reconstituted) based on (e.g., using) the first portion and the second portion. The first portion and the second portion may be combined (e.g., as a single bit sequence, a segment, a section, a frame, a block) to determine the content.

One or more of steps 1002, 1004, 1006, or 1008 may be repeated for a plurality of user accounts (e.g., or user devices). The second portions may be the same for at least a portion of the plurality of users (e.g., or each of the plurality of users). Only one copy of the second portion may be stored in the common storage. The first portions may be the same (e.g., identical, bitwise identical) for at least a portion of the plurality of users (e.g., or each of the plurality of user). The one or more selection rules may be applied (e.g., deterministically) such that the same first portions and same the same second portions are determined for each of the at least the portion of the users.

Figure 11:
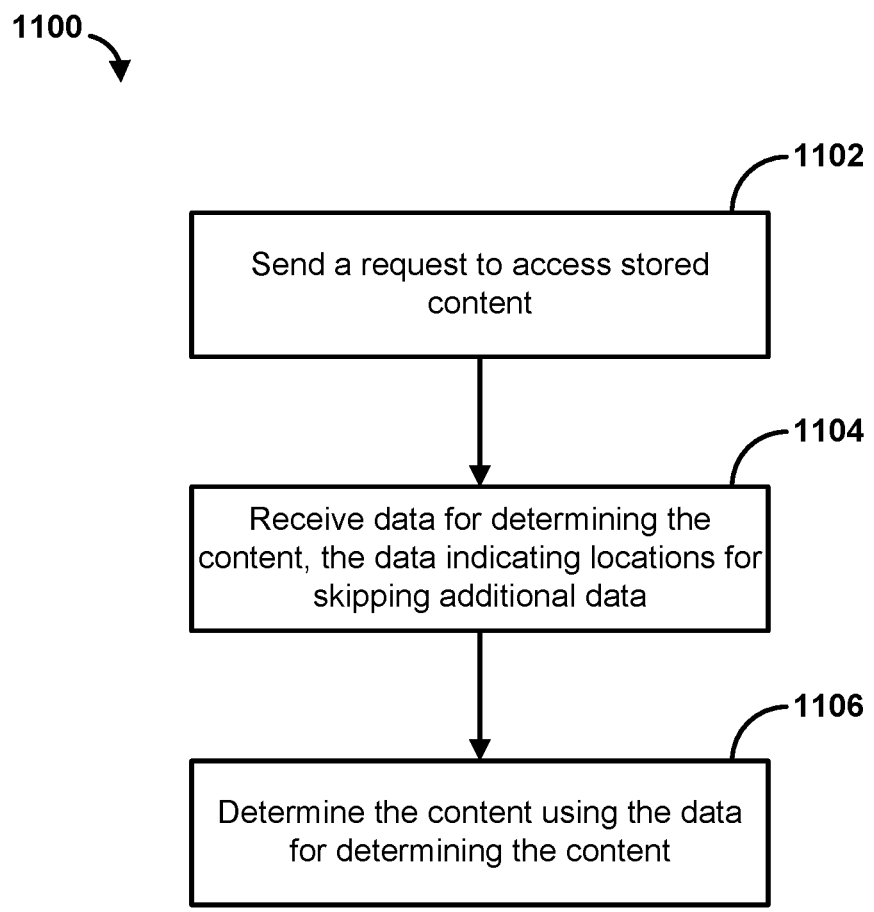
FIG. 11 is a flow diagram showing an example method.

FIG. 11 is a flow diagram showing an example method. The example method 1100 may comprise an example implementation of the process shown in FIG. 3B. The method 1100 may be implemented by one or more user devices, such as a mobile device, a streaming device, a content device, a television, a tablet, a laptop, a smart device (e.g., smart glasses, smart watch), and/or the like.

Content may be stored (e.g., by the computing device). The content may be stored according to the process described in FIG. 3B (e.g., and FIG. 10) and its accompanying paragraphs. The content may be stored according to any process described elsewhere herein. The content may be stored based on a request. The request may be sent to a computing device, a service, a server, and/or the like. The request to store content may be a request to access a channel. If a user accesses a channel, a determination to store content may be performed automatically. A user device may specifically request that the content is stored (e.g., or recorded).

The content may be stored based on storing portions of the content in user-specific storage and/or common storage. A first portion of the content may be determined using one or more selection rules, such as a randomization function. A second portion of the content may be determined. The second portion may comprise a remaining portion of the content (e.g., or a remaining portion of a section of content) not included in the first portion of the content. The first portion and the second portion may comprise portions of a section (e.g., segment, frame, bit sequence, block) of content. The first portion may be stored in user-specific storage associated with the user account. The second portion may be stored in common storage associated with a plurality of user accounts.

Additional data may be stored in the common storage with the second portion. The additional data may be prepended to, appended to, inserted within, and/or the like the second portion. The additional data may comprise random data. The random data may have a random length. The random length may be constrained by a minimum length and/or a maximum length). The random data can have randomly selected (e.g., or generated) data bits.

At step 1102, a request to access the stored content may be sent. The request may be associated with a user account of a plurality of user accounts. The request may be sent based on receiving a user selection of the stored content. An indication of the stored content may be output (e.g., via a display) to a user. The user may select the indication of the stored content and/or otherwise trigger the request to access the stored content.

At step 1104, data for determining the content may be received. The data for determining the content may comprise an index file (e.g., or manifest, or other data structure). The index file may comprise a record (e.g., entry) for each of a plurality of portions of the content. Each frame, segment, section, block, and/or like of the content may have one or more records comprising corresponding first portions and second portions of the content. The data for determining the content may comprise an indication of the first portion, a location of the first portion (e.g., a file, a directory, a byte offset in a bit sequence stored in the user-specific storage, a range of bits), and/or the like. The data for determining the content may comprise an indication of the second portion, a location of the second portion (e.g., a file, a directory, a byte offset in a bit sequence stored in the common storage, a range of bits), and/or the like. The data for determining the content may comprise an ordering of the first portion and the second portion (e.g., in a bit sequence).

The data for determining the content may comprise one or more instructions to not access the additional data, to skip the additional data, to ignore the additional data, or a combination thereof. The data for determining the content may comprise instructions for accessing the second portion such that the additional data is not accessed. The instructions for accessing the second portion may indicate the location of the second portion in a bit sequence without indicating the location of the additional data in the bit sequence. The instructions for accessing the second portion may comprise an instruction to skip a portion of a bit sequence comprising the additional data.

At step 1106, the stored content may be determined using the data for determining the content. The stored content may be determined by accessing (e.g., requesting) the first portion and the second portion using one or more of locations and/or ordering in the data for determining the content. The first portion and the second portion may be combined (e.g., as a single bit sequence, a segment, a section, a frame, a block) to determine the content. The determined content may be output via the user device.

Figure 12:
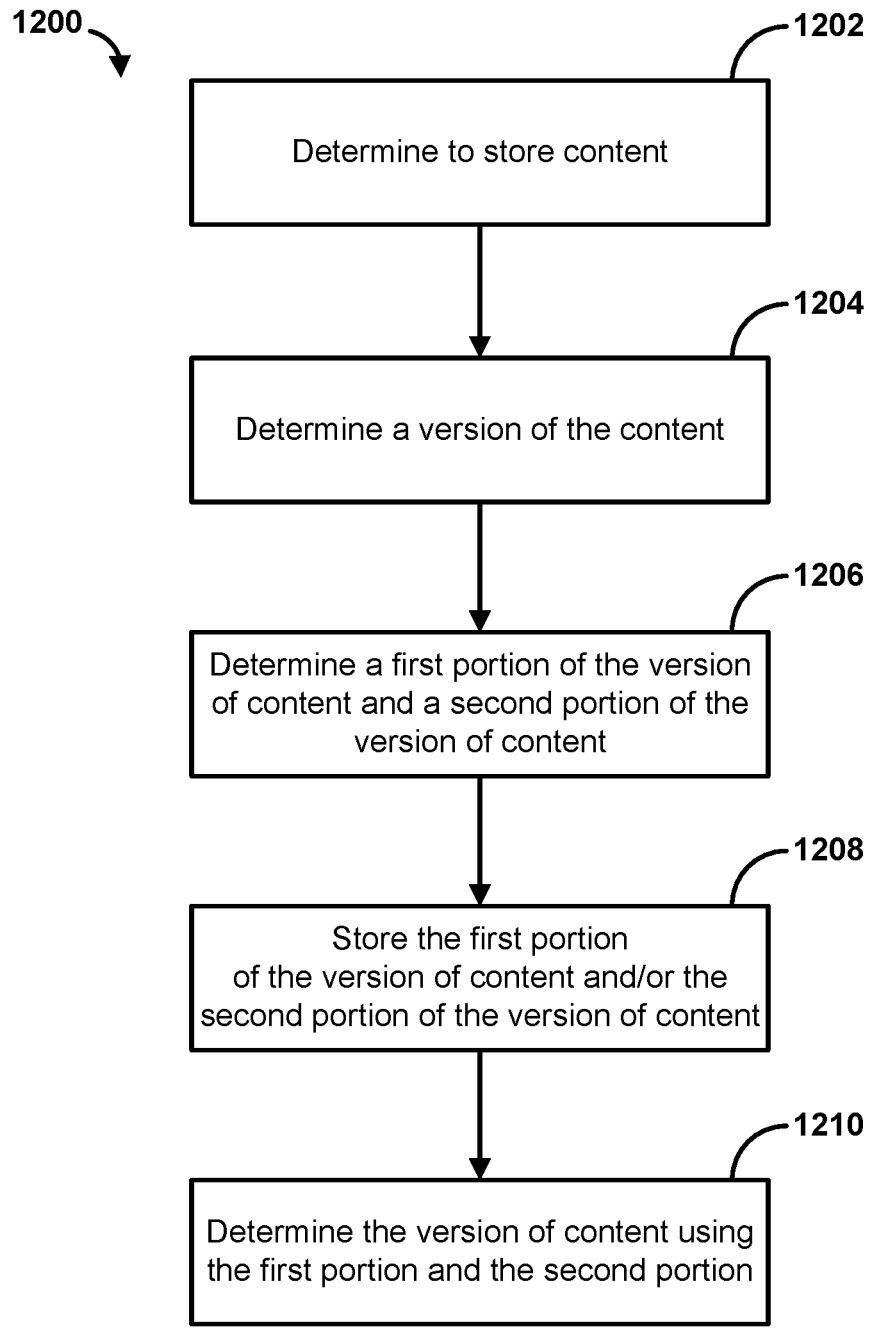
FIG. 12 is a flow diagram showing an example method.

FIG. 12 is a flow diagram showing an example method. The example method 1200 can comprise an example implementation of the process shown in FIG. 3C.

At step 1202, a determination may be made to store content. The content may be associated with (e.g., received via) a content channel. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The determination to store content associated with a content channel may be determined based on a request associated with a user account of a plurality user accounts. The request may be received from a user device. The request may be a request to access a channel. If a user accesses a channel, a determination to store content may be performed automatically. A user device may specifically request that the content is stored (e.g., or recorded).

At step 1204, a version of the content may be determined (e.g., based on and/or in response to the determination to store content or the request to store content. A plurality of versions of the content may be generated. The plurality of versions of the content may be generated by adding additional information, such as watermarking information, to the content. The version of the content may be determined randomly, such as using a randomization function. The version of the content may be determined for one of a plurality of sections (e.g., segments, frames, packets).

At step 1206, a first portion of the content and a second portion of the content may be determined. The first portion and/or the second portion may be determined using one or more selection rules (e.g., the one or more selection rules described herein), such as a randomization function. The first portion and/or the second portion may be portions of a segment, a section, a frame, a block, a bit sequence, and/or the like. The second portion may comprise a remaining portion of the content (e.g., or section of content) not included in the first portion.

At step 1208, the first portion and/or the second portion may be stored. The first portion may be stored in user-specific storage. The second portion of the content may be stored in common storage. Additional data may be stored in the common storage with the second portion. The additional data may be prepended to, appended to, inserted within, and/or the like the second portion. The additional data may comprise random data. The random data may have a random length. The random length may be constrained by a minimum length and/or a maximum length). The random data can have randomly selected (e.g., or generated) data bits.

One or more of steps 1202, 1204, 1206 or 1208 may be repeated (e.g., until all the content is stored). The content may comprise a plurality of sections (e.g., segments, frames, blocks, bits sequences). Each of the sections may be subdivided into one or more first portions and one or more second portions. The first portion and/or the second portion may be associated with different versions of the content from one section to another. If the plurality of versions of content comprises a version A and version B, then a sequence of sections may comprise any combination of version A and version B (e.g., ABA, AAA, BBB, ABB, BAA, BAB). One or more of the first portions may be stored as a single file, bit sequence, and/or the like in the user-specific storage. One or more of the second portions may be stored as a single file, bit sequence, and/or the like in the common storage. The additional data may be stored between two second portions stored in the common storage. The one or more selection rules may be applied such that the location and/or size of the one or more first portions may be different from one section to another. The one or more selection rules may be applied such that the location and/or size of the one or more second portions may be different from one section to another.

At step 1208, the content may be determined (e.g., reconstituted) based on the first portion and the second portion. The content may be determined based on (e.g., in response to) a request associated with a user account to access the content. The first portion and the second portion may be combined (e.g., as a single bit sequence, a segment, a section, a frame, a block) to determine the content.

One or more of steps 1202, 1204, 1206, or 1208 may be repeated for a plurality of user accounts (e.g., or user devices). At least a portion of the first portions may be different for at least a portion of the plurality of users (e.g., or each of the plurality of user). The content may comprise one or more versions of the content. The one or more versions may comprise watermarking data (e.g., predefined data). The watermarking data may be different for each of the one or more versions of the content.

Different user devices (e.g., associated with different user accounts) may request and/or otherwise be associated with different versions of the one or more versions of content. The one or more selection rules may be applied such that the watermarking data may only be selected as part of a first portion. Different user-specific storage associated with different user accounts may store different first portions (e.g., comprising different watermarking data). The second portions may be the same for at least a portion of the plurality of users (e.g., or each of the plurality of users). Only one copy of the second portion may be stored in the common storage. If the one or more selection rules cause one or more second portions to be determined that comprises watermarking data, different versions of the second portions may be stored in the common portion.

The first portion and/or the second portion may be associated with different versions of the content for different user accounts. The different versions of content may result in different sequences of watermarking and/or additional information for sections of content. If the plurality of versions of content comprises a version A and version B, then a sequence of sections stored for a first user account may comprise a first combination of version A and version B (e.g., ABA, AAA, BBB, ABB, BAA, BAB). The sequence of sections stored for the second user account may comprise a second combination of version A and B (e.g., BBB, ABA, ABB, BAB, AAA). The second combination may be different from the first combination.

Figure 13:
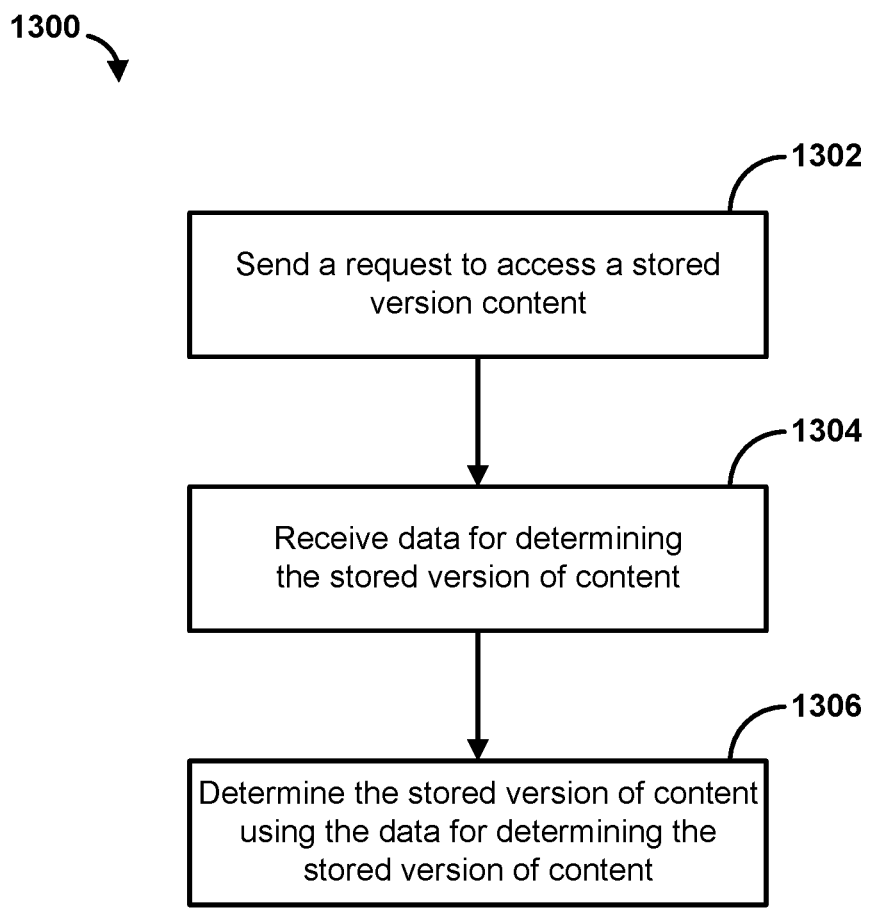
FIG. 13 is a flow diagram showing an example method.

FIG. 13 is a flow diagram showing an example method. The example method 1300 may comprise an example implementation of the process shown in FIG. 3C and its accompanying description. The method 1300 may be implemented by one or more user devices, such as a mobile device, a streaming device, a content device, a television, a tablet, a laptop, a smart device (e.g., smart glasses, smart watch), and/or the like.

A request to store content may be sent. The request may be sent to a computing device, a service, a server, and/or the like. The request to store content may be a request to access a channel. If a user accesses a channel, a determination to store content may be performed automatically. A user device may specifically request that the content is stored (e.g., or recorded).

The content may comprise one or more versions the content. The one or more versions of the content may comprise watermarking data (e.g., predefined data). The watermarking data may be different for each of the one or more versions of the content. Different user devices (e.g., associated with different user accounts) may request to store and/or otherwise be associated with different versions of the one or more versions of content. One or more selection rules may be applied such that the watermarking data may only be selected as part of a first portion store in user-specific storage. Different user-specific storage associated with different user accounts may store different first portions (e.g., comprising different watermarking data). The second portions may be the same for at least a portion of the plurality of users (e.g., or each of the plurality of users). Only one copy of the second portion may be stored in the common storage. If the one or more selection rules cause one or more second portions to be determined that comprises watermarking data, different versions of the second portions may be stored in the common portion.

One of the one or more versions of the content may be stored (e.g., by the computing device) for the user account associated with the request. The content may be stored according to the process described in FIG. 3C (e.g., and FIG. 12) and its accompanying paragraphs. The content may be stored according to any process described elsewhere herein. The content may be stored based on a request. The request may be sent to a computing device, a service, a server, and/or the like. The request to store content may be a request to access a channel. If a user accesses a channel, a determination to store content may be performed automatically. A user device may specifically request that the content is stored (e.g., or recorded).

The version of the one or more versions of content may be stored based on storing portions of the version of content in user-specific storage and/or common storage. A first portion of the version of content may be determined using one or more selection rules, such as a randomization function. A second portion of the versions of content may be determined. The second portion may comprise a remaining portion of the version of content (e.g., or a remaining portion of a section of the versions content) not included in the first portion of the content. The first portion and the second portion may comprise portions of a section (e.g., segment, frame, bit sequence, block) of version of content. The first portion may be stored in user-specific storage associated with the user account. The second portion may be stored in common storage associated with a plurality of user accounts.

The first portion and/or the second portion may be associated with different versions of the content for different user accounts. The different versions of content may result in different sequences of watermarking and/or additional information for sections of content. If the plurality of versions of content comprises a version A and version B, then a sequence of sections stored for a first user account may comprise a first combination of version A and version B (e.g., ABA, AAA, BBB, ABB, BAA, BAB). The sequence of sections stored for the second user account may comprise a second combination of version A and B (e.g., BBB, ABA, ABB, BAB, AAA). The second combination may be different from the first combination.

At step 1302, a request to access the stored version of content may be sent. The request may be associated with a user account of a plurality of user accounts. The request may be sent based on receiving a user selection of the stored version content (e.g., or a representation of the content that does not indicate a version of the content). An indication of the stored version of the content may be output (e.g., via a display) to a user. The user may select the indication of the stored version of the content and/or otherwise trigger the request to access the stored content.

At step 1304, data for determining the stored version of content may be received. The data for determining the stored version of the content may comprise an index file (e.g., or manifest, or other data structure). The index file may comprise a record (e.g., entry) for each of a plurality of portions of the content. Each frame, segment, section, block, and/or like of the content may have one or more records comprising corresponding first portions and second portions of the content. The data for determining the stored version of the content may comprise an indication of the first portion, a location of the first portion (e.g., a file, a directory, a byte offset in a bit sequence stored in the user-specific storage, a range of bits), and/or the like. The data for determining the stored version of the content may comprise an indication of the second portion, a location of the second portion (e.g., a file, a directory, a byte offset in a bit sequence stored in the common storage, a range of bits), and/or the like. The data for determining the stored version of the content may comprise an ordering of the first portion and the second portion (e.g., in a bit sequence).

At step 1306, the stored version of the content may be determined using the data for determining the content. The stored version of the content may be determined by accessing (e.g., requesting) the first portion and the second portion using one or more of locations and/or ordering in the data for determining the stored versions of the content. The determined version of the content may be output via the user device.

Figure 14:
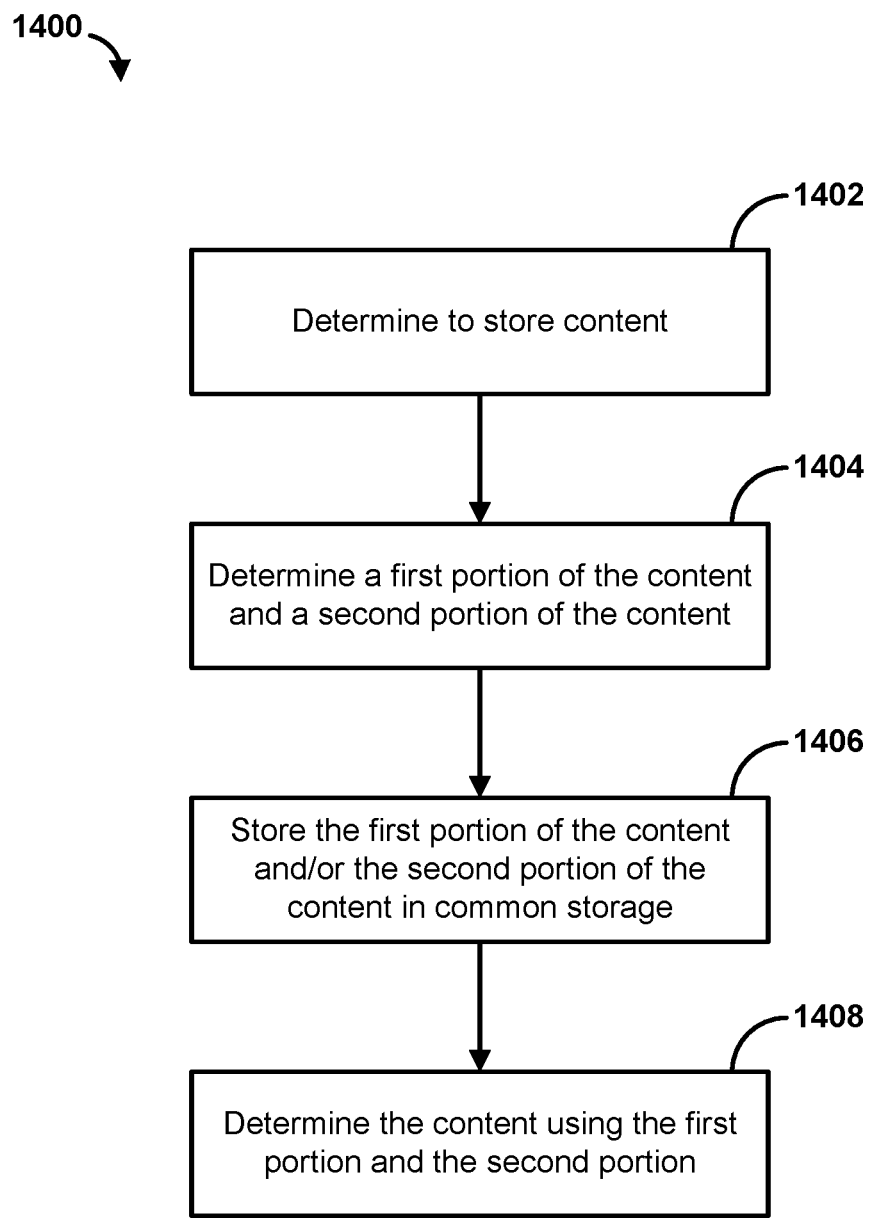
FIG. 14 is a flow diagram showing an example method.

FIG. 14 is a flow diagram showing an example method. The example method 1400 can comprise an example implementation of the process shown in FIG. 3D.

At step 1402, a determination may be made to store content. The content may be associated with (e.g., received via) a content channel. The content may comprise text, audio, video, an application (e.g., a game), a combination thereof and/or the like. The content channel may comprise a content stream, such as linear stream of content (e.g., live content). The content may comprise a show, movie, program, episode, broadcast, newscast, sportscasts, live stream, combination thereof, and/or the like. The determination to store content associated with a content channel may be determined based on a request associated with a user account of a plurality user accounts. The request may be received from a user device. The request may be a request to access a channel. If a user accesses a channel, a determination to store content may be performed automatically. A user device may specifically request that the content is stored (e.g., or recorded).

At step 1404, a first portion of the content and a second portion of the content may be determined. The first portion and/or the second portion may be determined using one or more selection rules (e.g., the one or more selection rules described herein), such as a randomization function. The first portion and/or the second portion may be portions of a segment, a section, a frame, a block, a bit sequence, and/or the like. The second portion may comprise a remaining portion of the content (e.g., or section of content) not included in the first portion.

At step 1406, the first portion and/or the second portion may be stored. The first portion may be stored in common storage. A plurality of copies of the first portion may be stored in the common storage. The plurality of copies may be stored as repeating copies of bits in bit sequence. The second portion may be stored in common storage. The second portion may be stored in the bit sequence (e.g., after the plurality of copies of the first portion). Data indicating a location (e.g., in the bit sequence) of one or the plurality of copies of the first portion may be stored in user-specific storage.

Additional data may be stored in the common storage with the first portion and/or the second portion. The additional data may be prepended to, appended to, inserted within, and/or the like the first portion and/or the second portion. The additional data may comprise random data. The random data may have a random length. The random length may be constrained by a minimum length and/or a maximum length). The random data can have randomly selected (e.g., or generated) data bits.

One or more of steps 1402, 1404, or 1406 may be repeated (e.g., until all the content is stored). The content may comprise a plurality of sections (e.g., segments, frames, blocks, bits sequences). Each of the sections may be subdivided into one or more first portions and one or more second portions. One or more of the first portions and/or second portions may be stored as a single file, bit sequence, and/or the like in the common storage. The additional data may be stored between two first portions stored in the common storage. The additional data may be stored between two second portions stored in the common storage. The one or more selection rules may be applied such that the location and/or size of the one or more first portions (e.g., and the plurality of copies of the first portions) may be different from one section to another. The one or more selection rules may be applied such that the location and/or size of the one or more second portions may be different from one section to another.

At step 1408, the content may be determined (e.g., reconstituted) based on (e.g., using) the first portion and the second portion. The content may be determined based on (e.g., in response to) a request associated with a user account to access the content. The first portion and the second portion may be combined (e.g., as a single bit sequence, a segment, a section, a frame, a block) to determine the content.

One or more of steps 1402, 1404, 1406, or 1408 may be repeated for a plurality of user accounts (e.g., or user devices). The second portions may be the same for at least a portion of the plurality of users (e.g., or each of the plurality of users). Only one copy of the second portion may be stored in the common storage. User-specific storage for each account may not store the first portions. The user-specific storage for each account may store different data indicating a corresponding location (e.g., in the bit sequence) of one of the plurality of copies of the first portion. The data indicating the corresponding location can indicate different locations corresponding to different copies of the first portions for different user accounts.

The one or more selection rules may be applied (e.g., deterministically) such that the same first portions and same the same second portions are determined for each of the at least the portion of the users.

Figure 15:
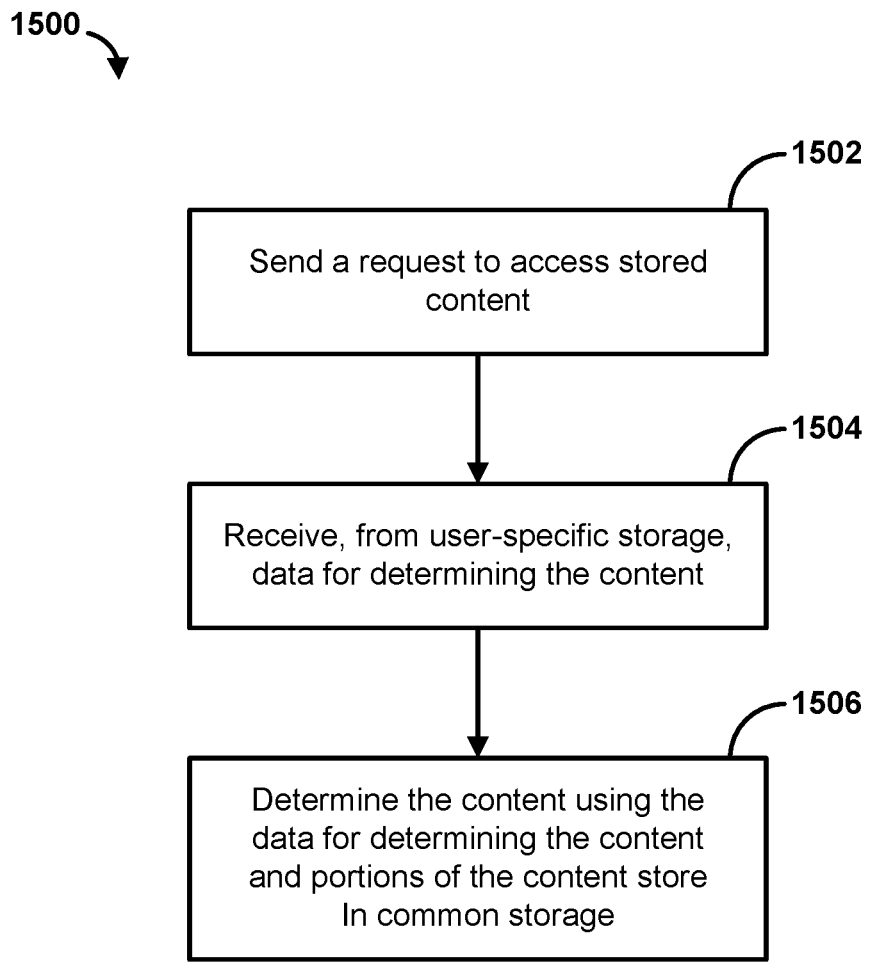
FIG. 15 is a flow diagram showing an example method.

FIG. 15 is a flow diagram showing an example method. The example method 1500 can comprise an example implementation of the process shown in FIG. 3D. The method 1500 may be implemented by one or more user devices, such as a mobile device, a streaming device, a content device, a television, a tablet, a laptop, a smart device (e.g., smart glasses, smart watch), and/or the like.

A request to store content may be sent. The request may be sent to a computing device, a service, a server, and/or the like. The request to store content may be a request to access a channel. If a user accesses a channel, a determination to store content may be performed automatically. A user device may specifically request that the content is stored (e.g., or recorded).

Content may be stored (e.g., by the computing device). The content may be stored according to the process described in FIG. 3D (e.g., and FIG. 10) and its accompanying paragraphs. The content may be stored according to any process described herein. The content may be stored based on a request to store content. The request may be sent to a computing device, a service, a server, and/or the like. The request to store content may be a request to access a channel. If a user accesses a channel, a determination to store content may be performed automatically. A user device may specifically request that the content is stored (e.g., or recorded).

The content may be stored based on storing portions (e.g., or data indicating portions) of the content in user-specific storage and/or common storage. A first portion of the content may be determined using one or more selection rules, such as a randomization function. A second portion of the content may be determined. The second portion may comprise a remaining portion of the content (e.g., or a remaining portion of a section of content) not included in the first portion of the content. The first portion and the second portion may comprise portions of a section (e.g., segment, frame, bit sequence, block) of content.

A plurality of copies of the first portion may be stored (e.g., in a bit sequence) in the common storage. The common storage may be associated with (e.g., accessible by) a plurality of user accounts. Data indicating a location of the one of the plurality of copies of the first portion may be stored in the user-specific storage. Different user-specific storage associated with different user accounts may comprise data indicating a location of different copies of the plurality of copies of the first portion. Additional data, such as randomized data, may be inserted between, appended to, prepended to, and/or the like one or more of the plurality of copies of the first portion. The second portion may be stored in common storage associated with a plurality of user accounts. The second portion may be stored after (e.g., in a bit sequence) the plurality of copies of the first portion.

At step 1502, a request to access the stored content may be sent. The request may be associated with a user account of a plurality of user accounts. The request may be sent based on receiving a user selection of the stored content. An indication of the stored content may be output (e.g., via a display) to a user. The user may select the indication of the stored content and/or otherwise trigger the request to access the stored content.

At step 1504, data for determining the content may be received. The data for determining the content may be received from and/or stored in the user-specific storage. The data for determining the content may comprise an index file (e.g., or manifest, or other data structure). The index file may comprise a record (e.g., entry) for each of a plurality of portions of the content. Each frame, segment, section, block, and/or like of the content may have one or more records comprising corresponding first portions and second portions of the content. The data for determining the content may comprise an indication of the first portion, a location of the first portion (e.g., a file, a directory, a byte offset in a bit sequence stored in the user-specific storage, a range of bits), and/or the like. The indication of the first portion may comprise a location (e.g., in a bit sequence) of a specific copy of the plurality of copies of the first portion. The data for determining the content may comprise an instruction to skip one or more bits in a bit sequence between the specified copy of the first portion and the second portion and/or one or more bits in the bit sequence before the specified copy of the first portion. The data for determining the content may comprise an indication of the second portion, a location of the second portion (e.g., a file, a directory, a byte offset in a bit sequence stored in the common storage, a range of bits), and/or the like. The data for determining the content may comprise an ordering of the first portion and the second portion (e.g., in a bit sequence).

At step 1506, the stored content may be determined using the data for determining the content. The content may be determined based on (e.g., in response to) a request associated with a user account to access the content. The first portion and the second portion may be combined (e.g., as a single bit sequence, a segment, a section, a frame, a block) to determine the content. The stored content may be determined by accessing (e.g., requesting) the first portion and the second portion using one or more of locations and/or ordering in the data for determining the content. The determined content may be output via the user device.

Figure 16:
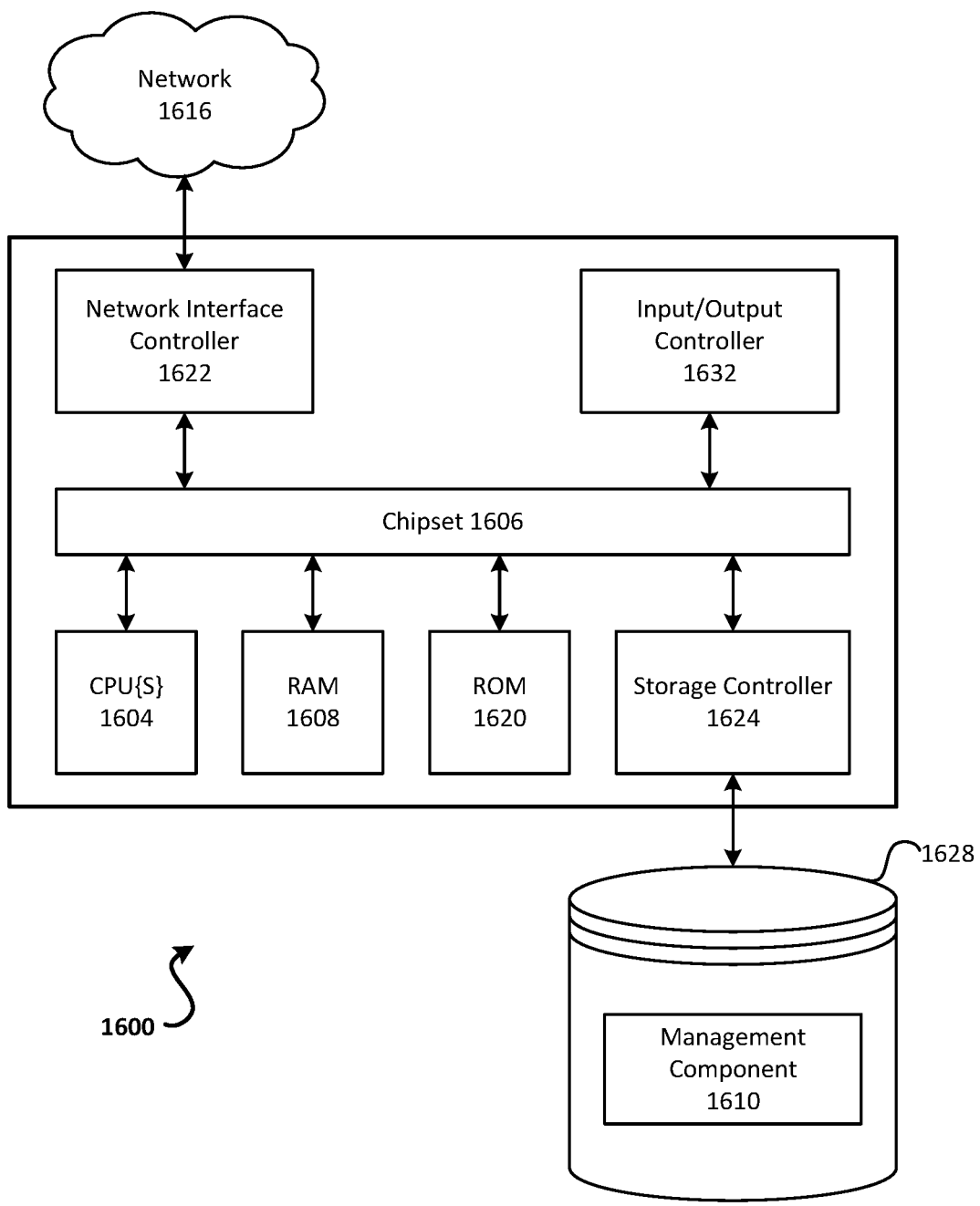
FIG. 16 is a block diagram illustrating an example computing device.

FIG. 16 shows a computing device that may be used in various aspects, such as any of the devices shown in FIG. 1 With regard to the example architecture of FIG. 1, the content device 102, the user device 106, the storage device 104 may each be implemented in an instance of a computing device 1600 of FIG. 16. The computer device shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement any of the systems and/or the methods described in relation to FIGS. 1-15.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1604 may be augmented with or replaced by other processing units, such as GPU(s) 1605. The GPU(s) 1605 may comprise processing units specialized for but not necessarily limited to highly parallel computations, such as graphics and other visualization-related processing.

A chipset 1606 may provide an interface between the CPU(s) 1604 and the remainder of the components and devices on the baseboard. The chipset 1606 may provide an interface to a random access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN) 1616. The chipset 1606 may include functionality for providing network connectivity through a network interface controller (NIC) 1622, such as a gigabit Ethernet adapter. A NIC 1622 may be capable of connecting the computing device 1600 to other computing nodes over a network 1616. It should be appreciated that multiple NICs 1622 may be present in the computing device 1600, connecting the computing device to other types of networks and remote computer systems.

The computing device 1600 may be connected to a mass storage device 1628 that provides non-volatile storage for the computer. The mass storage device 1628 may store system programs, application programs, other program modules, and data, which have been described in greater detail herein. The mass storage device 1628 may be connected to the computing device 1600 through a storage controller 1624 connected to the chipset 1606. The mass storage device 1628 may consist of one or more physical storage units. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on a mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving a first request to store a content item, and a second request to store the content item, wherein the first request is associated with a first user account of a plurality user accounts, and wherein the second request is associated with a second user account of the plurality of user accounts;
determining a header portion and a media portion of a segment of the content item and causing storage of the header portion;
determining, based on one or more selection rules and from the media portion of the content item, a first portion of the content item associated with the first user account and the second user account;
causing storage, of the first portion of the content item in a first user-specific storage area associated with the first user account, and of the first portion of the content item in a second user-specific storage area associated with the second user account; and
determining, from the media portion, a second portion of the content item, wherein the second portion of content item is stored in common storage associated with the plurality of user accounts, and wherein the second portion of the content item is associated with the plurality of user accounts.

2. The method of claim 1, further comprising determining not to store the second portion of the content item in the common storage associated with the plurality of user accounts, wherein determining not to store the second portion of the content item in common storage comprises determining that at least a part of the second portion is already stored in the common storage, and further comprising storing, in the first user-specific storage area and the second user-specific storage area, data indicating a location of the at least a part of the second portion.

3. The method of claim 1, further comprising storing, in the first user-specific storage area, data for determining the content item, wherein the data for determining the content item indicates a location of the first portion in the first user-specific storage area and a location of the second portion in the common storage.

4. The method of claim 1, wherein the one or more selection rules comprise one or more of a randomization rule, a randomization function, or a predefined rule for determining portions of the content item.

5. The method of claim 4, wherein the randomization function comprises a random number generator, and wherein the first portion is determined by using the randomization function to determine how many bytes to select from a beginning of a bit sequence of the content item.

6. The method of claim 1, further comprising:
determining a first section of a plurality of sections of the content item, wherein the first section comprises the header portion and the media portion, wherein the header portion comprises header data for processing video frame data in the media portion; and
wherein storing the header portion comprises storing the header portion in a file separate from the second portion and the first portion.

7. The method of claim 1, wherein causing storage, of the first portion of the content item in the first user-specific storage area associated with the first user account, and of the first portion of the content item in the second user-specific storage area associated with the second user account comprises storing two separate copies of the first portion in separate storage locations.

8. A method comprising:
receiving a plurality of requests to store content, wherein the plurality of requests are associated with a plurality of user accounts;
determining a header portion and a media portion of a segment of the content and causing storage of the header portion;
storing, based on one or more selection rules and from the media portion of the content, data indicative of a first portion of content in user-specific storage associated with a first user account of the plurality of user accounts;
storing, based on the one or more selection rules and from the media portion of the content, data indicative of a second portion of the content in user-specific storage associated with a second user account of the plurality of user accounts;
storing, from the media portion of the content, a common portion of the content, wherein the common portion is stored in common storage associated with the first user account and the second user account;
determining, based on the first portion and at least a portion of the common portion, the content; and
causing output of the determined content.

9. The method of claim 8, wherein storing the common portion comprises determining, based on a request associated with the first user account, to store the common portion and determining, based on a request associated with the second user account, that the common portion is already stored.

10. The method of claim 8, wherein the data indicative of the first portion of the content comprises one or more of data comprising the first portion or data comprising an index identifying a location of the first portion in one or more of the first user-specific storage or the common storage.

11. The method of claim 8, wherein the one or more selection rules comprise one or more of a randomization rule, a randomization function, or a predefined rule for determining portions of the content.

12. The method of claim 11, wherein the randomization function is configured to determine a random number, wherein the first portion and the second portion is determined by using the number to determine how many bytes to select from a beginning of a bit sequence defining the content.

13. The method of claim 8, further comprising:
determining a first section of a plurality of sections of the content, wherein the first section comprises the header portion and the media portion, and wherein the header portion comprises header data for processing video frame data in the media portion; and
wherein storing the header portion comprises storing the header portion in a file separate from the second portion and the first portion.

14. A device comprising:
one or more processors; and
memory storing instructions that, when executed by the one or more processors, cause the device to:
receive a first request to store a content item, and a second request to store the content item, wherein the first request is associated with a first user account of a plurality user accounts, and wherein the second request is associated with a second user account of the plurality of user accounts;
determine a header portion and a media portion of a segment of the content item and cause storage of the header portion;

determine, based on one or more selection rules and from the media portion of the content item, a first portion of the content item associated with the first user account and the second user account;

cause storage, of the first portion of the content item in a first user-specific storage area associated with the first user account, and of the first portion of the content item in a second user-specific storage area associated with the second user account; and determine, from the media portion, a second portion of the content item, wherein the second portion of content item is stored in common storage associated with the plurality of user accounts, and wherein the second portion of the content item is associated with the plurality of user accounts.

15. The device of claim 14, wherein the instructions, when executed by the one or more processors, further cause the device to:

determine not to store the second portion of the content item in the common storage associated with the plurality of user accounts, and wherein at least a part of the second portion is determined to already be stored in the common storage, and store, in the first user-specific storage area and the second user-specific storage area, data indicating a location of the at least a part of the second portion.

16. The device of claim 14, wherein the instructions, when executed by the one or more processors, further cause the device to store, in the first user-specific storage area, data for determining the content item, wherein the data for determining the content item indicates a location of the first portion in the first user-specific storage area and a location of the second portion in the common storage.

17. The device of claim 14, wherein the one or more selection rules comprise one or more of a device rule, a randomization function, or a predefined rule for determining portions of the content item.

18. The device of claim 17, wherein the randomization function comprises a random number generator, and wherein the first portion is determined by using the randomization function to determine how many bytes to select from a beginning of a bit sequence of the content item.

19. The device of claim 14, wherein the instructions, when executed by the one or more processors, further cause the device to:

determine a first section of a plurality of sections of the content item, wherein the first section comprises the header portion and the media portion, wherein the header portion comprises header data for processing video frame data in the media portion; and wherein the header portion is stored in a file separate from the second portion and the first portion.

20. The device of claim 14, wherein the instructions that, when executed by the one or more processors, cause the device to cause storage, of the first portion of the content item in the first user-specific storage area associated with the first user account, and of the first portion of the content item in a second user-specific storage area associated with the second user account comprises instructions that, when executed by the one or more processors, cause the device to store two separate copies of the first portion in separate storage locations.

21. A device comprising:
one or more processors; and
memory storing instructions that, when executed by the one or more processors, cause the device to:

receive a plurality of requests to store content, wherein the plurality of requests are associated with a plurality of user accounts;

determine a header portion and a media portion of a segment of the content and cause storage of the header portion;

store, based on one or more selection rules and from the media portion of the content, data indicative of a first portion of content in user-specific storage associated with a first user account of the plurality of user accounts;

store, based on the one or more selection rules and from the media portion of the content, data indicative of a second portion of the content in user-specific storage associated with a second user account of the plurality of user accounts;

store, from the media portion of the content, a common portion of the content, wherein the common portion is stored in common storage associated with the first user account and the second user account;

determine, based on the first portion and at least a portion of the common portion, the content; and cause output of the determined content.

22. The device of claim 21, wherein the instructions that, when executed by the one or more processors, cause the device to store the common portion comprises instructions that, when executed by the one or more processors, cause the device to determine, based on a request associated with the first user account, to store the common portion and determine, based on a request associated with the second user account, that the common portion is already stored.

23. The device of claim 21, wherein the data indicative of the first portion of the content comprises one or more of data comprising the first portion or data comprising an index identifying a location of the first portion in one or more of the first user-specific storage or the common storage.

24. The device of claim 21, wherein the one or more selection rules comprise one or more of a randomization rule, a randomization function, or a predefined rule for determining portions of the content.

25. The device of claim 24, wherein the randomization function is configured to determine a random number, wherein the first portion and the second portion is determined by using the number to determine how many bytes to select from a beginning of a bit sequence defining the content.

26. The device of claim 21, wherein the instructions, when executed by the one or more processors, further cause the device to:

determine a first section of a plurality of sections of the content, wherein the first section comprises the header portion and the media portion, and wherein the header portion comprises header data for processing video frame data in the media portion; and wherein the header portion is stored in a file separate from the second portion and the first portion.

27. The method of claim 1, wherein causing storage of the header portion comprises causing storage of at least a part of the header portion in the first user-specific storage area and the second user-specific storage area.

28. The method of claim 1, wherein the first portion is a first byte range of a single frame and the second portion is a second byte range of the frame.

29. The method of claim 1, wherein the media portion is encoded using arithmetic coding, and wherein determining the header portion and the media portion comprises separating header data from arithmetic coded data.

30. The method of claim 8, wherein determining the content comprises combining the header portion, the first portion, and the at least a portion of the common portion.

\* \* \* \* \*